United States Patent [19]

Kirimoto et al.

[11] Patent Number: 5,136,611

[45] Date of Patent: Aug. 4, 1992

[54] ORTHOGONAL SEQUENCE GENERATOR AND RADAR SYSTEM INCORPORATING THE GENERATOR

[75] Inventors: Tetsuo Kirimoto; Yoshimasa Ohhashi, both of Kanagawa, Japan

[73] Assignee: Mitsubishi Denki Kabushiki Kaisha, Tokyo, Japan

[21] Appl. No.: 642,193

[22] Filed: Jan. 16, 1991

[30] Foreign Application Priority Data

Jan. 22, 1990 [JP] Japan .................................. 2-12046
Nov. 29, 1990 [JP] Japan ................................. 2-333281

[51] Int. Cl.$^5$ ...................... H04L 27/30; G01S 13/02
[52] U.S. Cl. ......................................... 375/1; 380/34; 370/21; 342/195
[58] Field of Search ................... 375/1; 380/34, 37, 46; 370/18-23; 364/717; 331/78; 342/135, 157, 194, 195, 201, 202, 204

[56] References Cited

U.S. PATENT DOCUMENTS

| | | | |
|---|---|---|---|
| H,484 | 6/1988 | Holliday | 342/201 |
| 3,890,618 | 6/1975 | Speiser | 342/202 |
| 4,513,288 | 4/1985 | Weathers et al. | 342/201 |
| 4,939,745 | 7/1990 | Kirimoto et al. | 375/1 |

OTHER PUBLICATIONS

R. L. Frank, "Phase Shift Pulse Codes With Good Periodic Correlation Properties".
"IRE Trans. on Info. Theory"; (IT-8, Oct. 1962; pp. 381-382).
Suehiro et al., "Modulatable Orthogonal Sequences and Their Application to SSMA Systems"; IEEE Trans. on Info. Theory; (IT-34, No. 1; Jan. 1988; pp. 93-100).

Primary Examiner—Bernarr E. Gregory
Attorney, Agent, or Firm—Wolf, Greenfield & Sacks

[57] ABSTRACT

An apparatus, usable in a radar system, for generating a multi-value orthogonal sequence includes a multi-element M-sequence generator and a component substituting device. The M-sequence generator comprises a shift register including delay elements, multipliers for multiplying signals output from the respective delay elements by feedback factors, and adders for adding the multiplied signals from the multipliers to provide the result to the delay element initially arranged in the shift register whereby a multi-element M-sequence is generated from the delay element finally arranged therein. The substituting device comprises a microcomputer and substitutes each component of the M-sequence with one of complex-numbers, $Z_0, Z_i, \ldots Z_{q-1}$ in such a manner that when the component is 0, it is substituted with $Z_0 \neq 0$, and when it is $\epsilon^i$ ($i=1, 2, \ldots q-1$), it is substituted with $z_i$, where the set of $Z_0, Z_i, \ldots Z_{q-1}$ are the solution of the following simultaneous algebraic equations:

$$q^{k-2} \sum_{i=0}^{q-1} \sum_{j=0}^{q-1} z_i^* z_j - z_0^* z_0 = 0$$

$$q^{k-1} \sum_{i=0}^{q-1} z_i^* z_{\bmod_{q-1}(i+r)} + (q^{k-1} - 1) z_0^* z_0 = 0$$

where $\bmod_{q-1}(\cdot)$ represents a calculation of modulo $(q-1)$ and is expressed as $q-1$ when the result is 0, * represents a complex conjugate, and $r=1, 2, \ldots, q-2$.

15 Claims, 20 Drawing Sheets

$$\cos\phi_1 = -\frac{(N+1)A_1^2 + (N-3)}{2(N+1)A_1}$$

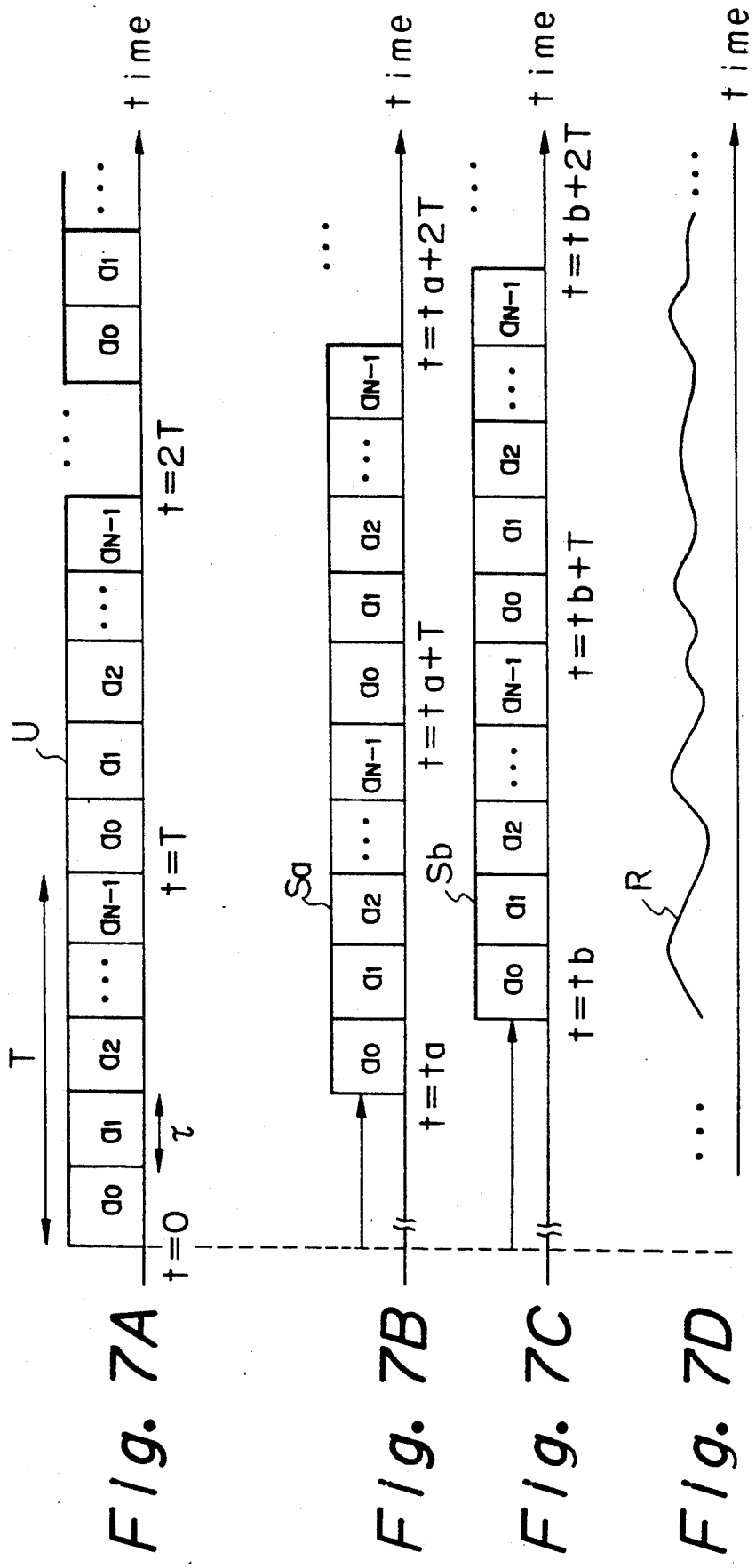

Fig. 11A

| q | k. | $(m_0, m_1, \ldots, m_{k-1})$ |
|---|---|---|
| 3 | 2 | (1,2) |
|   | 3 | (2,1,0) (2,2,1) |
|   | 4 | (1,2,0,0) (1,1,1,2) (1,2,1) |
|   | 5 | (2,1,0,0,0) (2,2,2,2,1) (2,0,2,1,0) |
|   | 6 | (2,0,0,0,0,2) (1,1,1,2,2,2) (1,1,2,1,1,0) |
|   | 7 | (2,0,1,0,0,0,0) (2,0,1,1,1,2,2) (2,2,1,1,1,0,2) |
| 5 | 2 | (1,4) (3,1) |
|   | 3 | (1,0,4) (3,1,1) (3,1,3) |
|   | 4 | (1,1,4,0) (3,4,0,4) (3,1,4,0) |
|   | 5 | (1,0,4,0,0) 3,0,4,3,3) (3,4,3,4,0) |
| 7 | 2 | (1,6) (5,1) (5,4) |
|   | 3 | (2,3,0) (4,5,1) (4,3,5) |
|   | 4 | (1,0,6,6) (5,3,4,2) (1,6,4,3) |
| 11 | 2 | (7,10) (1,7) (9,8) |
|   | 3 | (4,10,0) (2,5,2) (6,7,0) |
| $2^2$ | 2 | (1,3) (2,3) |
|   | 3 | (1,2,3) (2,1,3) (1,2,1) (2,1,2) |
|   | 4 | (1,1,1,3) (2,2,2,3) (1,1,2,0) (2,2,1,0) |
|   | 5 | (2,0,2,1,3) (1,0,1,2,3) (2,0,0,3,1) (1,0,0,3,2) |
|   | 6 | (1,3,3,0,0,0) (2,3,3,0,0,0) (2,1,2,3,2,1) (1,2,1,3,1,2) |
| $2^3$ | 2 | (6,4,) (5,1) (3,2) |
|   | 3 | (4,6,4) (1,5,1) (2,3,2) |
|   | 4 | (2,7,6,2) (4,7,5,4) (1,7,3,1) |
| $2^4$ | 2 | (2,4) (4,8) (8,1) (1,2) |
|   | 3 | (4,7,10) (8,14,5) (1,13,10) (2,11,5) |

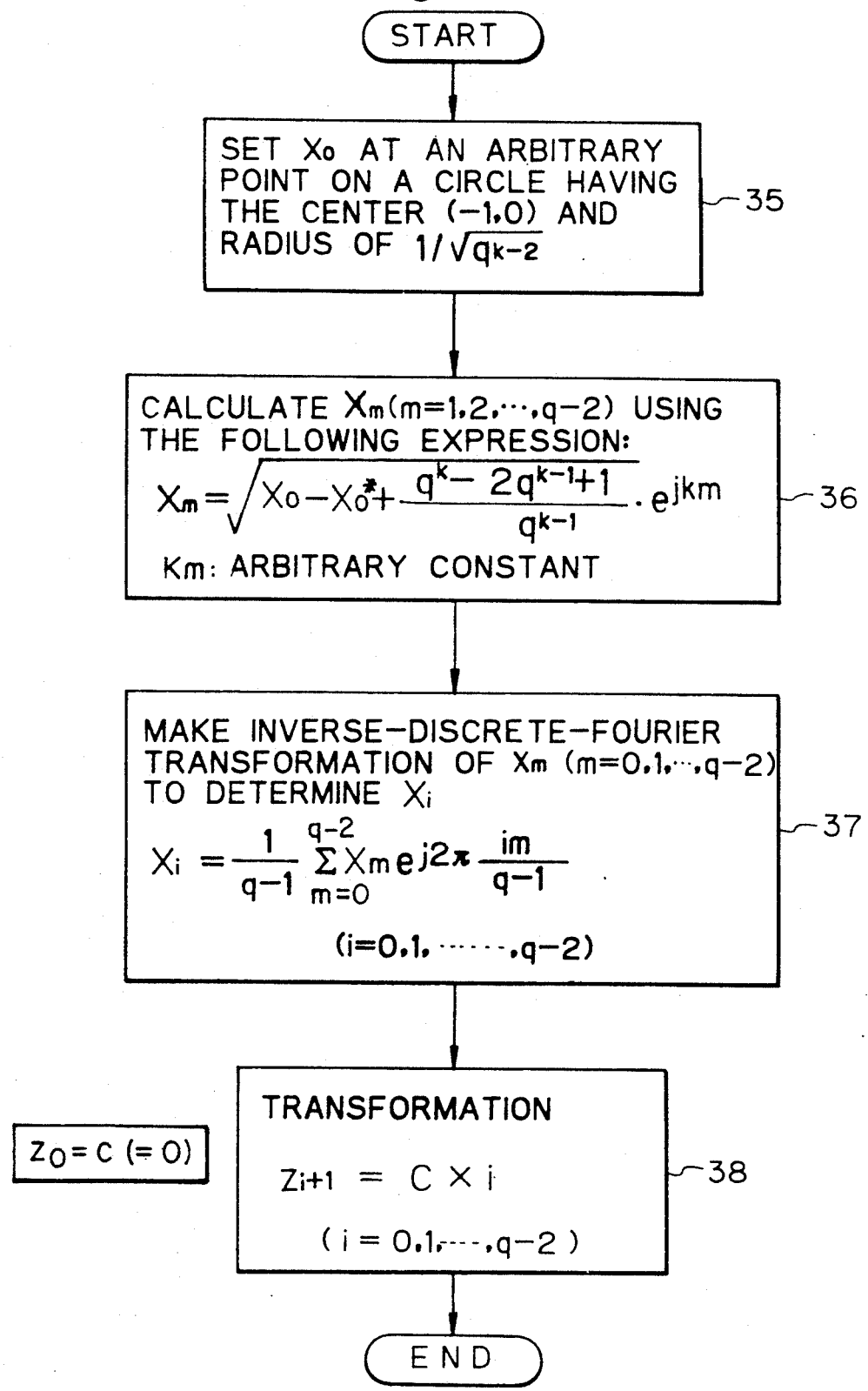

ORTHOGONAL SEQUENCE GENERATOR AND RADAR SYSTEM INCORPORATING THE GENERATOR

BACKGROUND OF THE INVENTION

1. Field of the Invention

This invention relates to a generator for generating an orthogonal sequence the components of which take various kinds of complex numbers and to a radar system including such an orthogonal sequence generator.

2. Prior Art

Before describing the prior art, the mathematical properties of the orthogonal sequences will first be described.

The term "sequence" used herein means time series of numerical values $a_n$ shown in expression 1, below:

$$\{a_n\} = \ldots a_{n-1} a_n a_{n+1} \ldots \quad (1)$$

n is a factor representing the order of the sequences. $a_n$ is referred to as a component of this sequence and is a complex number. The sequence $\{a_n\}$ is a periodic sequence in which there exists an integral number of N satisfying expression 2, below:

$$a_{n+N} = a_n \quad (2)$$

Thus, the sequence of expression 1 can be denoted by expression 3, below:

$$\{a_n\} = \ldots a_{N-1} a_0 a_1 a_2 \ldots a_{N-1} a_0 a_1 \ldots \quad (3)$$

In order to provide a quantum for describing the mathematical properties of such a sequence, an autocorrelation function as defined by expression 4, below, is often used:

$$\rho(m) = \left( 1 / \sum_{n=0}^{N-1} |a_n|^2 \right) \sum_{n=0}^{N-1} a_n^* \cdot a_{n+m} \quad (4)$$

$$(m = 0, 1, \ldots, N-1)$$

wherein, * represents a complex conjugate. The reason why the autocorrelation function is defined only within the range from $m=0$ to $m=N-1$, as shown in expression 4, is that the sequence $\{a_n\}$ is a periodic series and thus the autocorrelation function $\rho(m)$ is a periodic function. The period thereof is N and the same as that of the sequence $\{a_n\}$. Thus the function $\rho(m)$ satisfies the following expression:

$$\rho(m+N) = \rho(m) \quad (5)$$

When such a sequence is applied to a practical system, it is necessary that the autocorrelation function of expression 4 has such properties as shown in FIG. 1 of U.S. Pat. No. 4,939,745, infra i.e., the function of autocorrelation has a sharp peak at $m=0$ and takes a "considerably low value" in the remaining range of $m(m=1, \ldots, N-1)$. The portion $\rho(0)$ of the function at $m=0$ is referred to as the main lobe, and the other portion $\rho(m)$ $(m=1, \ldots, N-1)$ of the function than that at $m=0$ is referred to as the side lobe, and the magnitude of the side lobe relative to the main lobe $\rho(0)$ poses a problem to be discussed. The magnitude of the side lobe which is a "considerably low value" must thus satisfy relation 6, below:

$$|\rho(m)| << |\rho(0)| \quad (6)$$

$$(m = 1, 2, \ldots, N-1)$$

With the satisfaction of relation 6, the sequence having zero magnitude of the side lobe of the autocorrelation function, i.e., satisfying expression 7, below, has excellent properties:

$$\rho(m) = \begin{cases} \rho(0) & (m = 0) \\ 0 & (1 \leq m \leq N-1) \end{cases} \quad (7)$$

The orthogonal sequence is defined as satisfying expression 7.

Among the systems for generating orthogonal sequences having such properties, there are complex two-value orthogonal sequence generating systems as disclosed, for example, in U.S. Pat. No. 4,939,745 by the same inventors as those of this application and entitled "Apparatus for Generating Orthogonal Sequences" and polyphase orthogonal sequence generating systems as disclosed in the article of "Phase Shift Pulse Codes with Good Periodic Correlation Properties" by R. Frank, et al., *IRE Transaction Information Theory*, Vol. IT-8, pp. 381-382; October 1962, U.S.A.

FIG. 1 shows an arrangement of the orthogonal sequence generator disclosed in U.S. Pat. No. 4,939,745. The generator comprises a two-element M-sequence generator on GF(2) 3 consisting of a linear feedback shift-resistor and a component substituting device 4 having substitution means for substituting a component $a_n$ for a component $b_n$ of a two-element M-sequence $\{b_n\}$ output from the device 4 and outputting it. FIG. 2 is a flowchart showing the operation of the component substituting device 4 of FIG. 1. The above-mentioned substituting device sets the values of the component $a_n$ to the following complex number, corresponding to the component $b_n$ being 0 or 1:

$$a_n = A_0 \exp(j\phi_0) = A_0 e^{j\phi_0} (\text{when } b_n = 0) \quad (8)$$

$$a_n = A_1 \exp(j\phi_1) = A_1 e^{j\phi_1} (\text{when } b_n = 1) \quad (9)$$

$A_0$, $\phi_0$, $A_1$ and $\phi_1$ are set to satisfy the following expression:

$$\cos(\phi_1 - \phi_0) = -\frac{(N+1)(A_1/A_0)^2 + N - 3}{2(N+1)(A_1/A_0)} \quad (10)$$

where N is a period of the M-sequence. Since $A_o = 1$ and $\phi_o = 0$, normally, expression 10 is denoted by the following expression:

$$\cos(\phi_1) = -\frac{(N+1)A_1^2 + N - 3}{2(N+1)A_1} \quad (11)$$

The sequence $\{a_n\}$ is indicated as an orthogonal sequence and the period N is the same as that of the M-sequence $\{b_n\}$ which is denoted by $N = 2^k - 1$. The component $a_n$ of the sequence $\{a_n\}$ takes two complex number values and thus the physical quantity one-to-one corresponding thereto is limited to two kinds.

FIG. 3 is a vector diagram of the component $a_n$ of the orthogonal sequence $\{a_n\}$. The component $a_n$ can take two values, 1 and $Ae^{j\phi}$.

FIG. 4 shows a flowchart of creating the polyphase orthogonal sequence described in the above-referred IRE Information Theory. This polyphase orthogonal sequence $\{a_n\}$ has, as components, the L-power root of 1 (w) denoted by expression 12 and the power of L-power root of 1 ($w^k$) denoted by expression 13:

$$w = \exp(j2\pi/L)(L \text{ is an integer} \geq 2) \quad (12)$$

$$w^k = \exp(j2\pi k/L)(k \text{ is an integer}) \quad (13)$$

Thus, the sequence can be denoted by the following expression:

$$\{a_n\} = \begin{matrix} w^0, & w^0, & w^0, & \ldots, & w^0, \\ w^0, & w^1, & w^2, & \ldots, & w^{L-1}, \\ w^0, & w^2, & w^4, & \ldots, & w^{2(L-1)}, \\ \cdot \\ \cdot \\ \cdot \\ w^0, & w^{L-1}, & w^{2(L-1)}, & \ldots, & w^{(L-1)(L-1)} \end{matrix} \quad (14)$$

The period N of the polyphase orthogonal sequence $\{a_n\}$ is uniquely determined by L and denoted as $N = L^2$. As shown with expression 13, the amplitude of the component $w^k$ of the sequence $\{a_n\}$ does not depend on the value of k, but 1, and its phase takes an L-number of values from 0 to $2\pi(L-1)/L$ at every interval of $(2\pi/L)$. Moreover, once the period N has been determined, the sequence is determined into only one form.

FIG. 5 is a vector diagram showing an example component group $\{w^k\}$ of the polyphase orthogonal sequence $\{a_n\}$ at L=8. In this case, the amplitude of all the components are 1 and the phase takes 8 values at every $\pi/4$.

Turning now to a radar system provided with an orthogonal sequence generator, there is a radar system provided with a complex two-value orthogonal sequence, as disclosed, for example, in U.S. Pat. No. 4,939,745 mentioned above.

FIG. 6 shows an arrangement of a radar system disclosed in the above U.S. patent. As shown in the drawing, it comprises a local oscillator 11 for generating a sinusoidal wave signal $e^{j\omega t}$, an orthogonal sequence generator 13 arranged as shown in FIG. 1 for generating a complex two-value orthogonal sequence $\{a_n\}$, a modulator 12 for code-modulating the sinusoidal wave signal $e^{j\omega t}$ by using the complex two-value orthogonal sequence $\{a_n\}$, a power amplifier 14 for amplifying a code-modulated transmission signal U and radiating an output through a transmission antenna 16 to an external space, a low-noise amplifier 15 for amplifying a reception signal R received by a reception antenna 17 including reflection signals Sa and Sb from two targets 10a and 10b and for transferring the amplified signal, a detector 18 for converting the reception signal R in the RF band to a detection signal V in the video band and a demodulator 19 for performing the correlation process operation of the detection signal V and the sequence $\{a_n\}$ to output a demodulated signal Z.

The basic operation of the radar system shown in FIG. 6 will now be described.

In order to simplify the description, the mathematical expression of the signals will be made by complex signals. As shown by the Euler's formula of the following expression 15, the real signal can correspond to the real part of the complex signal:

$$e^{j\omega t} = \exp(j\omega t) = \cos \omega t + j \sin \omega t \quad (15)$$

where, j: imaginary unit.

FIGS. 7A–7D are diagrams showing timing relationships between the transmission and reception signals U and R shown in FIG. 6. In FIGS. 7A–7D, the code-modulated transmission signal U, reflected signal Sa from the target 10a, reflected signal Sb from the target 10b and reception signal R are respectively illustrated in explanatory form.

As shown in the drawing, the change-over of the component $a_n$ is performed at every period of time $\tau$ so that a component $a_0$ is used in the time interval between $t=0$ and $t=\tau$ and a component $a_1$ is used in the time interval between $t=\tau$ and $t=2\tau$, ..., thereby code-modulating the sinusoidal wave signal $e^{j\omega t}$ generated by the local oscillator 11 to provide the transmission signal U.

The code-modulated transmission signal U is denoted by the following expression:

$$U(t) = \sum_{n=-\infty}^{\infty} rect\left(\frac{t - n\tau}{\tau}\right) \cdot a_n \exp(j\omega t) \quad (16a)$$

where, rect(t) is a rectangular function as defined by the following expression:

$$rect(t) = \begin{cases} 1 & (0 \leq t < 1) \\ 0 & (\text{otherwise}) \end{cases} \quad (16b)$$

The modulation is expressed by the product of the component $a_n$ of the sequence $\{a_n\}$ and the sinusoidal wave signal $e^{j\omega t}$. Since the sequence $\{a_n\}$ is a periodic series, the modulated transmission signal U is also a periodic sequence having a period of $T = N\tau$.

Because the reflected signals Sa and Sb are created by reflecting a part of the transmission signal U on the targets, the waveforms thereof are similar to the waveform of the transmission signal U. However, the timing each of the reflected signals Sa and Sb being received by the reception antenna 17 is delayed by such a time as required for the radio wave to propagate twice the slant range between the radar system and each target. In FIGS. 7B and 7C, such time delays are indicated by ta and tb with respect to the reflected signals Sa and Sb, respectively. Thus, the mathematical expressions Sa(t), Sb(t) of the reflected signals Sa, Sb are expressed by the following expressions:

$$\begin{aligned} Sa(t) &= \eta_a U(t - t_a) \\ &= \eta_a \sum_{n=-\infty}^{\infty} rect\left(\frac{t - t_a - n\tau}{\tau}\right). \\ & \quad a_n \exp\{j\omega(t - t_a)\} \end{aligned} \quad (17a)$$

-continued $$Sb(t) = \eta_b U(t - t_b) \quad (17b)$$

$$= \eta_b \sum_{n=-\infty}^{\infty} rect\left(\frac{t - t_b - n\tau}{\tau}\right) \cdot a_n \exp\{j\omega(t - t_b)\}$$

where, $\eta_a$, $\eta_b$ are constant values representing the intensities of reflection of the radio waves on the targets 10a and 10b.

Since the reception signal R is a compound signal including both the reflected signals Sa and Sb, its mathematical expression R(t) is given as follows:

$$R(t) = Sa(t) + Sb(t) \quad (18)$$
$$= \eta_a U(t - t_a) + \eta_b U(t - t_b)$$

The detector 18 phase-detects the signal R and this can be expressed as the multiplication of the signal R(t) and $\exp(-j\omega t)$. Thus, the detection signal V can be expressed as follows:

$$V(t) = R(t) \cdot \exp(-j\omega t) \quad (19)$$
$$= \eta_a \sum_{n=-\infty}^{\infty} rect\left(\frac{t - t_a - n\tau}{\tau}\right) \cdot a_n \exp(-j\omega t_a) +$$
$$\eta_b \sum_{n=-\infty}^{\infty} rect\left(\frac{t - t_b - n\tau}{\tau}\right) \cdot a_n \exp(-j\omega t_b)$$

The correlation process of the detection signal $V(=V_{(t)})$ and the sequence $\{a_n\}$ is performed in the demodulator 19. The detection signal V output from the detector 18 is sampled in the demodulator 19 and then converted to a digital signal. The sampling period in this case is set to be the same as the time period $\tau$ of changingover the components of the sequence shown in FIG. 7A. The detection signal $V(k\tau)$ $(k=\ldots, -1, 0, 1, \ldots)$ which is converted to the digital signal can be expressed as follows:

$$V(k\tau) = \eta_a \sum_{n=-\infty}^{\infty} rect(k - k_a - n) \cdot a_n \exp(-j\omega k_a \tau) + \quad (20)$$
$$\eta_b \sum_{n=-\infty}^{\infty} rect(k - k_b - n) \cdot a_n \exp(-j\omega k_b \tau)$$

where, $t_a = k_a \cdot \tau$, and $t_b = k_b \cdot \tau$.

Taking into consideration that the rectangular function rect(t) is 0 out of range of $0 \leq t < 1$, as shown in expression 16b, expression 20 can be simply expressed as follows:

$$V(k) = \eta_a \exp(-j\omega\tau k_a)a_{k-k_a} + \eta_b \exp(-j\omega\tau k_b)a_{k-k_b} \quad (21)$$

The demodulator 19 performs a correlation process operation as shown in the following expression using the sampled and converted detection signal $V (=V_{(k\tau)})$ and the complex two-value orthogonal sequence $\{a_n\}$ provided from the orthogonal sequence generator 13 to output a demodulated signal $Z (=Z_{(k)})$:

$$Z(k) = \left(1 / \sum_{n=0}^{N-1} |a_n|^2\right) \cdot \sum_{n=0}^{N-1} a_n^* \cdot V_{(n+k)} \quad (22)$$

Expression 22 is substituted by the following expression by using expression 21:

$$Z(k) = \eta_a \exp(-j\omega\tau k_a) \cdot \quad (23)$$
$$\left[\left(1 / \sum_{n=0}^{N-1} |a_n|^2\right) \sum_{n=0}^{N-1} a_n^* \cdot a_{n+k-k_a}\right] +$$
$$\eta_b \exp(-j\omega\tau k_b) \cdot \left[\left(1 / \sum_{n=0}^{N-1} |a_n|^2\right) \sum_{n=0}^{N-1} a_n^* \cdot a_{n+k-k_b}\right]$$

Comparing expression 23 with expression 4, the terms parenthesized by [ ] in expression 23 represent autocorrelation functions of the complex two-value orthogonal sequence $\{a_n\}$, and thus expression 23 can be rewritten using the autocorrelation function $\rho(m)$ to obtain the expression, below:

$$Z(k) = \eta_a \exp(-j\omega\tau k_a)\rho(k-k_a) + \eta_b \exp(-j\omega\tau k_b)\rho(k-k_b) \quad (24)$$

As shown by expression 24, the demodulated signal Z(k) is in the form of adding the autocorrelation functions of the sequences regarding the signals Sa and Sb.

FIGS. 8A–8C show waveforms of the amplitude of the demodulated signal Z(k). FIG. 8C shows amplitude-waveforms in the case of the sequence being orthogonal, while FIGS. 8A and 8B show amplitude-waveforms in the case of the sequence being non-orthogonal.

The radar system shown in FIG. 6 can derive such advantages that since the sequence $\{a_n\}$ employed in the code-modulation operation is an orthogonal sequence having the side lobe of the autocorrelation function of 0, even when there is a substantial difference between the radiowave reflection intensities $\eta_a$ and $\eta_b$ on the adjacent two targets, the two-target signals Za and Zb can be detected from the demodulated signal Z(k) without the main lobe of the signal Zb having a small-magnitude being covered by any side lobe Ya of the large-magnitude signal Za as shown in FIG. 8C.

On the contrary, the radar system using the complex two-value orthogonal sequence for code modulation has a property such that when the period N of the sequence is relatively large and if any other electronic device which receives such a transmission signal includes a square detector, an output of the square detector would be a sinusoidal wave signal, whereby the angular frequency $\omega$ of the transmission signal could easily be detected.

That is, in the case of the period N of the sequence being large, expression 11 can approximately be expressed as follows:

$$\cos\phi \approx -\frac{A^2 + 1}{2A} \quad (25)$$

Since $\cos\phi \leq 1$, $A = 1$ and $\phi = \pi$ are obtained from expression 25.

Then, the code-modulated transmission signal U(t) can be approximately expressed by the following expression:

$$U(t) \approx \sum_{n=-\infty}^{\infty} \text{rect}\left(\frac{t - n\tau}{\tau}\right) \cdot \exp(\omega t + \phi_n) \quad (26)$$

where, $\phi_n = 0$ when $a_n = 1$, and $\phi_n = \pi$ when $a_n = -1$.

When expressing the U(t) in the form of real signal, it is expressed as follows:

$$U(t) \approx \sum_{n=-\infty}^{\infty} \text{rect}\left(\frac{t - n\tau}{\tau}\right) \cdot \cos(\omega t + \phi_n) \quad (27)$$

In the case of such a transmission signal U(t) being received by any other electronic device which is provided with a square detector, an output signal Y(t) of the square detector can be expressed as follows:

$$Y(t) = U^2(t) \quad (28)$$

$$\approx \sum_{n=-\infty}^{\infty} \text{rect}\left(\frac{t - n\tau}{\tau}\right) \cdot \cos^2(\omega t + \phi_n)$$

$$= \sum_{n=-\infty}^{\infty} \text{rect}\left(\frac{t - n\tau}{\tau}\right) \cdot (1/2)\{1 + \cos 2(\omega t + \phi_n)\}$$

Since $2\phi_n$ is 0 or $2\pi$, irrespective of the value n, Y(t) can take the following relation:

$$Y(t) = (\cos 2\omega t + 1)/2 \quad (29)$$

Thus, Y(t) indicates a sinusoidal wave signal, and if the frequency components of the signal Y(t) is analyzed by a spectrum analyzer, the angular frequency $\omega$ of the transmission signal U(t) will be able to be simply detected, even when the complex two-value orthogonal sequence $\{a_n\}$ is unknown.

FIG. 9 shows an exemplary arrangement of the modulator 12 shown in FIG. 6 in the event that the already-described complex two-value orthogonal sequence $\{a_n\}$ is used for code modulation. The components $a_n$ of the sequence $\{a_n\}$ takes two complex number values and thus the physical quantity corresponding one-by-one thereto is limited to two kinds. Accordingly, the number of change-over of the phase at the modulator is two irrespective of the period of the sequence and, as a consequence, the required number of phase shifters is one.

FIG. 10 also shows another exemplary arrangement of the modulator 12 shown in FIG. 6 in the event that the already-described conventional polyphase orthogonal sequence $w^k$ is used for code modulation. In the case that the period N of the polyphase orthogonal sequence is 64, the number L of change-over of the phase at the modulator is 8 ($=\sqrt{N}$), and thus the required number of phase shifters is 7 ($=\sqrt{N}-1$).

In the above-mentioned prior generators for generating an orthogonal sequence having a property that the side lobe of the autocorrelation function thereof is 0, the components thereof take two complex numbers and thus the physical quantities corresponding one-to-one thereto one limited to only two kinds. On the contrary, the polyphase orthogonal sequences are limited to one sequence existing with respect to a particular period N. However, in the case of a multi-value sequence signal being required, or a plurality of sequence signals with respect to the particular sequence period N being required in order to improve interference-resisting and cross talk-preventing performances of a radar system, a communication system, a home automation system or a factory automation system, there has been a problem as to have to produce such kinds of orthogonal sequence.

In a radar system, moreover, a purpose of providing a code modulation using a sequence is to convert a transmission signal to a quasi-noise signal and then radiate it to an external space so that in the transmitted radio signal is hardly detected by any other electronic device, for example other radars. In such a kind of radar system, it is particularly important that the angular frequency $\omega$ of the transmission signal cannot be detected by any other electronic device. However, there has been a problem such that when the prior complex two-value orthogonal sequence is employed for code modulation, if the period thereof is relatively large, the angular frequency $\omega$ of the transmission signal from the radar system can easily be detected by any other electronic device which receives such a transmission signal.

Further, when the conventional polyphase orthogonal sequence is employed for code modulation in a radar system, the number of change-overs of the phase at a modulator depends on the period of the polyphase orthogonal sequence, and thus if the period of the sequence is large, the arrangement of the modulator becomes complicated.

SUMMARY OF THE INVENTION

The present invention is made to solve the above-mentioned problems and an object of this invention is to provide an orthogonal sequence generator capable of generating a multi-value orthogonal sequence the components of which take many kinds of values and generating a plurality of orthogonal sequences with respect to a particular period N of the sequence.

Another object of this invention is to provide a radar system in which the number of change-over of the phase at a code modulator is small in comparison with a conventional system to simplify the arrangement of the modulator.

A further object of this invention is to provide a radar system wherein a code modulated transmission signal can hardly be detected by any other electronic device.

In order to attain the above-mentioned objects, the orthogonal sequence generator of the present invention comprises an M-sequence generating means for outputting a multi-element M-sequence having components consisting of elements of $0, \epsilon, \epsilon^2, \ldots, \epsilon^{q-1}$, of GF(q), where q is an integer equal to or larger than 3, GF(q) is a finite field having a q-number of elements and $\epsilon$ is a primitive element of the finite field, the M-sequence also having a period $N = q^k - 1$, where k is an integer equal to or larger than 2; and a substitution means for outputting complex number of $z_0, \ldots, z_{q-1}$ which are the solutions of the following simultaneous algebraic equations processing $\text{mod}_{q-1}(\cdot)$, where $\text{mod}_{q-1}(\cdot)$ is a calculation modulus (q−1) which is expressed as q−1 when the result is 0, and * is a complex conjugate, and the complex number being substituted for by $z_0$ in the case of the component of the multi-element M-sequence being 0 and by $z_i$ in the case of the component being $\epsilon^i$ (i = 1, 2, ..., q−1).

$$q^{k-2} \sum_{i=0}^{q-1} \sum_{j=0}^{q-1} z_i^* z_j - z_0^* z_0 = 0 \quad (30)$$

-continued $$q^{k-1} \sum_{i=1}^{q-1} z_i^* z_{mod\,q-1(i+r)} + (q^{k-1} - 1) z_o^* z_o = 0 \quad (31)$$

$$(r = 1, 2, \ldots, q - 2)$$

There is further provided a radar system including a modulator for code modulating a sinusoidal wave signal using a sequence to output a transmission signal, a demodulator for processing the correlation between the detection signal and the sequence to provide a demodulated signal and a sequence generating means for supplying the sequence to the modulator and the demodulator, comprising the orthogonal sequence generator as described above.

BRIEF DESCRIPTION OF THE DRAWINGS

FIGS. 7A–7D are diagrams explanatorily showing the timings of the transmission and receiving signals of the radar system shown in FIG. 6;

FIG. 11A is a table of feedback coefficients with which a k-stage linear feedback shift register create a multi-element M-sequence on GF(q);

FIGS. 13A–13C are flowcharts showing how to obtain the solution of simultaneous equations usable in the embodiment of the invention shown in FIG. 11;

DETAILED DESCRIPTION OF THE PREFERRED EMBODIMENTS

Before describing embodiments of the invention, the definition of a necessary finite field and its basic properties will first be described.

The finite field referred to herein is the same as that defined in "Dictionary of Mathematics (Third Edition)" published by Iwanami-Shoten, 1985. In sets including two or more finite elements, a set is referred to as a finite field wherein two kinds of calculation, addition and multiplication, are defined, an inverse element with respect to each of the calculations exists uniquely and a distributive law exists between the addition and the multiplication. The finite field is referred to as a Galois field in connection with the man who first defined it, and the finite field having q-number of elements is generally represented by GF(q).

The properties of the finite field GF(q) are shown in "Code Theory (Third Edition)" by Miyakawa, Iwadare, et al., published by Shokodo, 1976. Some of the basic properties necessary to explain embodiments of this invention will now be described:

(a) The finite field exists only when $q = p^m$, where p is a prime number and m is a positive integer. For example, a finite field having $q=2 (=2^1)$, $4 (=2^2)$, $5 (=5^1)$ or $7 (=7^1)$ exists, but a finite field having $q=6 (=2^1 \times 3^1)$ does not exist.

(b) GF(q) always includes a zero-element which is represented by 0. Also, GF(q) always includes an identity element which is particularly represented by 1.

(c) GF(q) always includes an element $\epsilon$ which satisfies $\epsilon^{q-1} = 1$, and $\epsilon$ is referred to as a prmitive element.

(d) Elements of GF(q) other than the zero-element can be expressed using (q−1)-number of elements $\epsilon, \epsilon^2, \ldots, \epsilon^{q-1} (=1)$ given by the power of the primitive element $\epsilon$.

For example, GF(5) is a finite field defined by the calculation modulo 5, and the primitive element of GF(5), the element of which is 0, 1, 2, 3, or 4, is 2 ($\epsilon = 2$). Accordingly, $\epsilon = 2$, $\epsilon^2 = 4$, $\epsilon^3 = 8 = 3$ and $\epsilon^4 = 16 = 1$, and it is therefore appreciated that elements of GF(5) other than the zero-element 0 can be represented by the power of the primitive element $\epsilon$.

An embodiment of the orthogonal sequence generator of the present invention will now be described with reference to the drawings.

Figure 11:
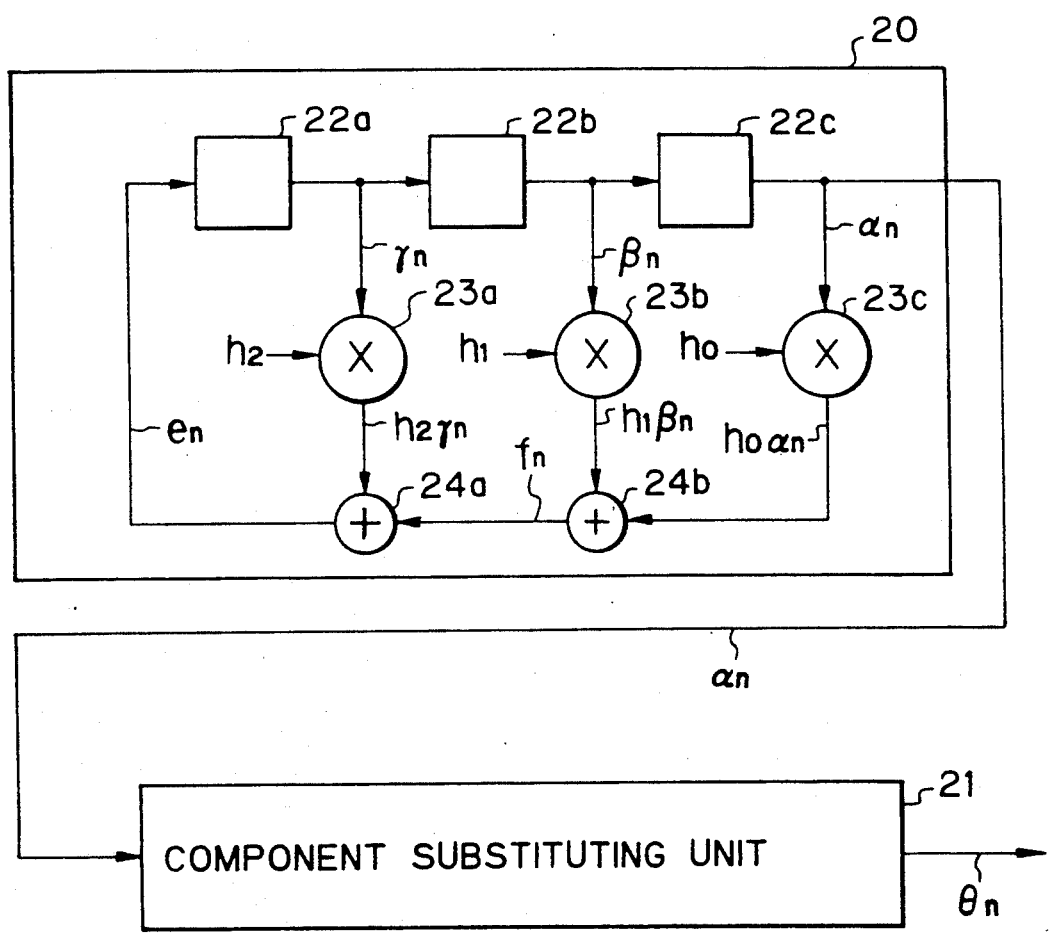
FIG. 11 is a schematic representation of an embodiment of an complex multi-value orthogonal sequence generator of the present invention.

FIG. 11 is a diagrammatic representation of an embodiment of a complex multi-value orthogonal sequence generator in accordance with the present invention.

In the drawing, 20 denotes a linear feedback shift register as a multi-element M-sequence generator, 22a, 22b and 22c delay elements having the same delay period of 1-time slot, 23a, 23b and 23c processors for performing the multiplication in the finite field (referred to as multiplier hereinbelow), 24a and 24b processors for performing the addition in the finite field (referred to as adder hereinbelow) and 21 a component substitution unit as a substitution means with which an arrangement of components $a_n$ created by the multi-element M-sequence generator 20 is substituted with a multi-kind complex number and then output. The component substitution unit 21 comprises a microcomputer.

The operation of the multi-element M-sequence generator 20 will now be described.

In FIG. 11, it is assumed that values currently maintained at the delay elements 22a–22c are $\gamma_n$, $\beta_n$ and $\alpha_n$. The delay elements accumulate values input thereto synchronously with a timing clock pulse and deliver them to the multipliers 23a–23c and to the delay elements 22b and 22c and the component substituting unit 21, synchronously with the next timing clock pulse.

When these values $\gamma_n$, $\beta_n$ and $\alpha_n$ are provided to the respective multipliers 23a-23c, they calculate the products of feedback coefficients $h_2$, $h_1$ and $h_0$ preset thereat and the input values $\gamma_n$, $\beta_n$ and $\alpha_n$ and output the product values $h_2\gamma_n$, $h_1\beta_n$ and $h_0\alpha_n$.

The adder 24b sums the value $h_0\alpha_n$ output from the multiplier 23c and the value $h_1\beta_n$ output from the multiplier 23b, and provides the result $f_n = h_0\alpha_n + h_1\beta_n$ to the adder 24a.

The adder 24a determines the sum of the value $f_n$ and the value $h_2\gamma_n$ transferred from the multiplier 23a, and then transfer the resulting output $e_n = h_0\alpha_n + h_1\beta_n + h_2\gamma_n$ to the delay element 22a. The above-described operation is repeated synchronously with the timing clock pulses to create the sequence $\{\alpha_n\}$.

Each of $\alpha_n$, $\beta_n$, $\gamma_n$, $h_0$, $h_1$, $h_2$, $f_n$ and $e_n$ is an element of the finite field GF(q) and takes either one of 0, $\epsilon$, $\epsilon^2$, ..., $\epsilon^{q-1}$.

The multiplication is defined in the finite field GF(q) and expressed by the following expressions using arbitrary elements a, b, of GF(q).

$$a \cdot b = \begin{cases} 0 & \text{(when } a = 0 \text{ or } b = 0) \quad (32a) \\ \epsilon \text{mod}_{q-1}(i + r) & \text{(when } a = \epsilon^i \text{ and } b = \epsilon^r) \quad (32b) \end{cases}$$

where, $\text{mod}_{q-1}(\cdot)$ represents the process modulo $q-1$ and is denoted as $q-1$ when the result is 0. From the definition of the primitive element, $$\epsilon^{q-1} = 1 \tag{33}$$

The addition is defined in the finite field GF(q) and can be uniquely defined if the value of q is determined.

For example, in the case of $q=3$, the addition and the multiplication are shown in Table 1, and in the case of $q=2^2$, they are shown in Table 2.

TABLE 1

| Calculation Modulo 3 (q = 3) | | | | | | |
|---|---|---|---|---|---|---|
| (a) Addition | | | | (b) Multiplication | | |
| + | 0 | 1 | 2 | · | 0 | 1 | 2 |
| 0 | 0 | 1 | 2 | 0 | 0 | 0 | 0 |
| 1 | 1 | 2 | 0 | 1 | 0 | 1 | 2 |
| 2 | 2 | 0 | 1 | 2 | 0 | 2 | 1 |

TABLE 2

| Calculation Modulo p (x) = $x^2 + x + 1$ (q = $2^2$) | | | | |
|---|---|---|---|---|
| (a) Addition | | | | |
| + | {0} | {1} | {x} | {x + 1} |
| {0} | {0} | {1} | {x} | {x + 1} |
| {1} | {1} | {0} | {x + 1} | {x} |
| {x} | {x} | {x + 1} | {0} | {1} |
| {x + 1} | {x + 1} | {x} | {1} | {0} |
| (b) Multiplication | | | | |
| · | {0} | {1} | {x} | {x + 1} |
| {0} | {0} | {0} | {0} | {0} |
| {1} | {0} | {1} | {x} | {x + 1} |
| {x} | {0} | {x} | {x + 1} | {1} |
| {x + 1} | {0} | {x + 1} | {1} | {x} |

With the linear feedback shift register 20 arranged as mentioned above, the sequence $\{\alpha_n\}$ created by applying initial values other than all zero to the delay elements 22a-22c is known as a multi-element M-sequence. The multi-element M-sequence has the largest period among the sequences created from the linear feedback shift register.

In the embodiment shown in FIG. 11, the delay elements in the linear feedback shift register are arranged at three stages, but they can be extended over k-stages. However, it is necessary to satisfy some limited combinations of the feedback coefficient values in order to create the multi-element M-sequence with the k-stage linear feedback shift register. Such combinations have already been obtained and an example combination is shown in FIG. 11A. Since the feedback coefficient $h_i$ is the element of GF(q), the elements other than 0 are expressed by the following expression using the primitive element $\epsilon$, and thus in FIG. 11A, 0-element is expressed using 0 and other elements are expressed using $m_i$, $$h_i = \epsilon^{m_i} (m_i = 1, 2, \ldots, q-1) \tag{34}$$

The operation of the component substituting unit 21 will be described. The component substituting unit 21 is provided with means for substituting a component $\theta_n$ for the component $\alpha_n$ of the multi-element M-sequence $\{\alpha_n\}$ created by the linear feedback shift register 20. The substitution operation is performed in accordance with a program of the microcomputer as the substitution means.

Figure 12:
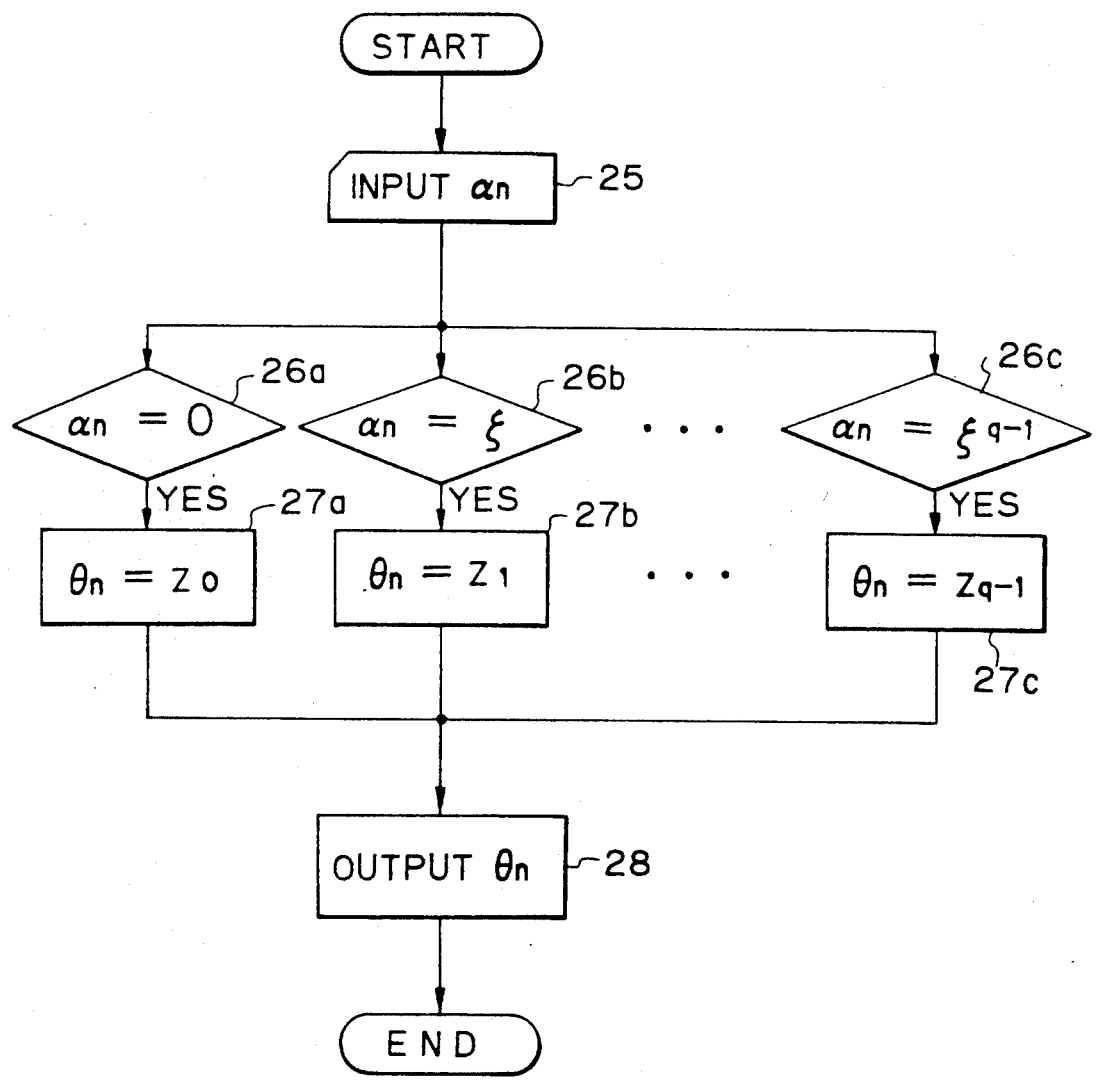
FIG. 12 is a flowchart showing the operation of the component substituting unit shown in FIG. 11.

FIG. 12 is a flowchart showing the operation of the component substituting unit 21 of the embodiment.

At step 25, the component $\alpha_n$ of the multi-element M-sequence $\{\alpha_n\}$ transferred from the linear feedback shift register 20 is successively input to the substituting unit 21, and then at steps 26a-26c, the unit 21 determines whether the component $\alpha_n$ is 0, $\epsilon$, ... or $\epsilon^{q-1}$. If $\alpha_n = 0$, then at step 27a, it is set at a complex number of $\theta_n = z_0$, and if $\alpha_n = \epsilon^i$ (i=1, 2, ..., q−1), then at steps 27b-27c, it is set at a complex-number $\theta_n = z_i$. In any case, at the subsequent step 28, the obtained complex-number $\theta_n$ which is one of ($z_0$, $z_1$, ..., $z_{q-1}$) is output to the exterior.

The complex-numbers $z_0$, $z_1$, ..., $z_{q-1}$ are the solution of the simultaneous equations indicated by the following expressions which are the same as expressions 30 and 31 and preliminarily determined and stored in the microcomputer of the component substituting unit:

$$q^{k-2} \sum_{i=0}^{q-1} \sum_{j=0}^{q-1} z_i^* z_j - z_0^* z_0 = 0 \tag{30}$$

$$q^{k-1} \sum_{i=1}^{q-1} z_i^* z_{\text{mod}_{q-1}(i+r)} + (q^{k-1} - 1) z_0^* z_0 = 0 \tag{31}$$

$$(r = 1, 2, \ldots, q-2)$$

Following is the explanation of the sequence $\{\theta_n\}$ created in the above manner being an orthogonal sequence.

For this purpose, the basic properties of a multi-element M-sequence $\{\alpha_n\}$ (simply referred to as M-sequence hereinbelow) shown in "Code Theory (Third Edition)" by Miyakawa, Iawdare, et al., Shokodo, 1976, will first be described:

(1) The period N of M-sequence is $N = q^k - 1$.

(2) In one period of the M-sequence, a $(q^{k-1} - 1)$-number of 0-elements is included and a $(q^{k-1})$-number of other elements $\epsilon^i$ (i=1, ..., q−1) is included.

(3) If a set of the sequence having a length N including one period $(\alpha_0, \ldots, \alpha_1, \ldots, \alpha_{N-1})$ of the M-sequence and its all of the cyclic permutations is added by $(0, \ldots, 0)$, the longest sequence code having a code length of $N = q^k - 1$ is obtained.

(4) The longest sequence code is an equi-distance code having an equal signal distance between two arbitrary codes, and the signal distance is expressed by the following expression:

$$d_H = q^{k-1} \tag{35}$$

If two codes are indicated as $A = (a_0, a_1, \ldots, a_{N-1})$ and $B = (b_0, b_1, \ldots, b_{N-1})$, the signal distance $d_H$ is defined as follows:

$$d_H(A, B) = \sum_{n=0}^{N-1} C_n \tag{36}$$

where $$C_n = \begin{cases} 0 & (\text{when } a_n = b_n) \\ 1 & (\text{when } a_n \neq b_n) \end{cases}$$

(5) The longest sequence code forms a k-dimensional linear vector space in GF(q), where k is the number of stages of the shift register.

(6) The basic vector of the k-dimensional linear vector space can obtained as follows:

The primitive element $\alpha$ in $GF(q^k)$ is expressed by the following column vector:

$$\alpha = (a_{11}, a_{21}, \ldots, a_{k1})^T \tag{37}$$

where, $a_{11}, a_{21}, \ldots, a_{k1} \in GF(q)$, that is: $a_{11} - a_{k1}$ are elements in GF(q). Its power vectors $\alpha, \alpha^2, \ldots, \alpha^N$ (N: period of M-sequence) are arranged to create the following matrix g.

$$g = \begin{pmatrix} a_{11} & a_{12} & \cdots & a_{1N} \\ a_{21} & a_{22} & \cdots & a_{2N} \\ \vdots & & & \\ a_{k1} & a_{k2} & \cdots & a_{kN} \end{pmatrix} \tag{38}$$

The k-number of column vectors $v_i$ ($i = 1, 2, \ldots, k$) of the matrix g is the basic vectors.

$$\begin{aligned} v_1 &= (a_{11}, a_{12}, \ldots, a_{1N}) \\ v_2 &= (a_{21}, a_{22}, \ldots, a_{2N}) \\ &\vdots \\ v_k &= (a_{k1}, a_{k2}, \ldots, a_{kN}) \end{aligned} \tag{39}$$

(7) $\epsilon$ is the primitive element of GF(q) and t is an integer defined as $t = (q^k - 1)/(q - 1)$. If g' is put as indicated below, $$g' = [\alpha, \alpha^2, \ldots, \alpha^t] \tag{40}$$

then the matrix g of expression 38 is expressed as follows:ps $$g = [g', \epsilon g', \epsilon^2 g', \ldots, \epsilon^{q-1} g'] \tag{41}$$

(8) When the longest sequence code other than $0 = (0, 0, \ldots, 0)$ corresponds to the vector expressed by the following expression:

$$\begin{aligned} B_0 &= (\alpha_0, \alpha_1, \ldots, \alpha_{N-1}) \\ B_1 &= (\alpha_1, \alpha_2, \ldots, \alpha_1) \\ &\vdots \\ B_{N-1} &= (\alpha_{N-1}, \alpha_0, \ldots, \alpha_{N-2}) \end{aligned} \tag{42}$$

$B_n$ ($n = 0, 1, \ldots, N - 1$) can be expressed by a linear combination of the basic vectors $v_i$ ($i = 1, 2, \ldots, N - 1$) as follows:

$$B_n = c_1(n) v_1 + c_2(n) v_2 + \ldots + c_k(n) v_k \tag{43}$$

$$(n = 0, 1, \ldots, N-1)$$

where, $c_1(n), c_2(n), \ldots, c_k(n) \in GF(q)$.

The number of combinations of $c_1(n), c_2(n), \ldots, c_k(n)$ is $q^k - 1$, because of excluding $c_1 = c_2 = \ldots = c_k = 0$. The number $q^{k-1}$ coincides with the period of the M-sequence.

For example, if $k = 2$, $h_0 = 2$ and $h_1 = 1$, then the content of one period of the M-sequence in GF(5) having a period length of $24 = 5^2 - 1$ is as follows:

$$(014434023313041121032242) \tag{44}$$

It is apparent that the M-sequence representable by expression 44 satisfies the above basic properties (1), (2) and (4).

In this case, the matrix g of expression 38 is as follows:

$$g = \begin{pmatrix} 014434023313041121032242 \\ 103224201443402331304112 \end{pmatrix} \tag{45}$$

Accordingly, $$\begin{aligned} v_1 &= (014434023313041121032242) & (46a) \\ v_2 &= (103224201443402331304112) & (46b) \end{aligned}$$

It is easily confirmed that all the vectors corresponding to expression 42 are obtained by the linear combination of $v_1$ with $v_2$. It is further noted that one period of the M-sequence of expression 44 can be divided into four quite similar blocks each having six-length, (014434), (023313), (041121) and (032242), that is: the second block (023313) is the first block (014434) multiplied by 2, and the third and fourth blocks are the first block multiplied by 4 and 3, respectively. It is appreciated that since the primitive element of GF(5) is 2, the above basic property (7) of the M-sequence is satisfied.

In order to show the sequence $\{\theta_n\}$ created by the component substituting unit 21 being an orthogonal sequence, the autocorrelation function $\rho(m)$ of the sequence $\{\theta_n\}$ at $m \neq 0$ must first be determined and then the condition under which the sequence $\{\theta_n\}$ is the orthogonal sequence, i.e., $\rho(m) = 0$ ($m = 1, 2, 3, \ldots, N - 1$) must be approved.

The autocorrelation function $\rho(m)$ of the sequence $\{\theta_n\}$ at $m \neq 0$ is expressed by the following expression using the basic property (2) of the M-sequence:

$$\rho(m) = [K_m(0,0) z_0 * z_0 + \ldots + K_m(0, q-1) z_0 * z_{q-1} + \tag{47}$$

$$K_m(1,0) z_1 * z_0 + \ldots + K_m(1, q-1) z_1 * z_{q-1} +$$

-continued $$K_m(q - 1, 0) z_{q-1} {}^* z_0 + \ldots +$$

$$K_m(q - 1, q - 1) z_{q-1} {}^* z_{q-1}]/[(q^{k-1} - 1) |z_0|^2 +$$

$$q^{k-1} (|z_1|^2 + \ldots + |z_{q-1}|^2)]$$

$$= \left[ \sum_{i=0}^{q-1} \sum_{j=0}^{q-1} K_m(i,j) z_i {}^* z_j \right] / \left( q^{k-1} \sum_{i=0}^{q-1} |z_i|^2 - |z_0|^2 \right)$$

$$(m = 1, 2, \ldots, N - 1)$$

where, $K_m(i,j)$ $(i, j = 0, 1, \ldots, q-1)$ is the number of the terms $z_i z_j$ contained in the autocorrelation function $\rho(m)$ and thus is a function of m. Since the sequence $\{\theta_n\}$ is obtained by substituting it for the M-sequence $\{a_n\}$, $K_m(i,j)$ can be considered as follows: The M-sequence $\{a_n\}$ and all the sequences obtained by cyclically permutating it are expressed corresponding to the vector $B_n$ (n=0, 1, ..., N−1) as indicated by expression 42, and the values of the components, other than 0, of $B_o$ and $B_n$ are expressed by the power $\epsilon^i$ of the primitive element $\epsilon$ of GF(q).

Now, as shown by $0 \to 0$ and $\epsilon^i \to i$ (i = 1, 2, ..., q−1), when the values of components other than 0 are expressed by symbolizing them with the number of the power i, then $K_m(i,j)$ (i, j=0, 1, ..., q−1) can be defined as the number of components in which the value of the component of the vector $B_0$ is i and the value of the component of the vector $B_m$ is j.

The values of $K_m(i,j)$ so defined will now be obtained using the basic property (5), i.e., the vector $B_n$ (n=0, 1, ..., N−1) indicated by expression 42 forms the k-dimensional linear vector space.

First, the vector $B_m$ (m=0, 1, ..., N−1) is expressed by the following expressions using a suitable basic vector $v_i$ (i=1, 2, ..., k) of the k-dimensional linear vector space based on the basic property (8):

$$B_m = \begin{cases} v_1 & (m = 0) \\ c_1(m)v_1 + c_2(m)v_2 + \ldots + c_k(m)v_k & \end{cases} \quad \begin{array}{l}(48a)\\(48b)\end{array}$$

$$(m = 1, 2, \ldots, N - 1)$$

where, $c_1(m), c_2(m), \ldots, c_k(m) \in GF(q)$.

Even when the vector $B_0$ is expressed by expression 48a, the generality is not lost. This is because the condition that $v_1$ through $v_k$ are the basic vectors is $v_1$ through $v_k$ being linearly independent and thus the k-number of basic vectors can be selected such that one of them is $B_0$ with the property of the linear vector space. As is clear from expressions 48a and 48b, among an (N−1)-number of vectors $B_m$ (m=1, ..., N−1), a (q−2)-number of vectors $B_m = c_1(m)v_1$ (in the case of $c_2(m) = c_3(m) = \ldots = c_k(m) = 0$) is linearly dependent upon $B_0$, the other N−1−(q−2) number of vectors are linearly independent of $B_0$.

First, the case of $B_0$ and $B_m$ being linearly dependent will be considered.

When $B_m$ linearly depending upon $B_0$ is expressed by $B_m'$ as follows:

$$B_m' = c_1(m') \cdot v_1 = c_1(m') \cdot B_0 \qquad (49)$$

where, $c_1(m')$ is an element of GF(q) other than 0 and 1. Thus, $c_1(m')$ is expressed by the following expression using the primitive element $\epsilon$.

$$c_1(m') = \epsilon^r (r = 1, 2, \ldots, q-2) \qquad (50)$$

The relation between m′ and r is expressed by the following expression based on the basic property (7) of the M-sequence:

$$m' = (q^{k-1} - 1)r/(q-1) \qquad (51)$$

$$(r = 1, 2, \ldots, q-2)$$

Using expressions 49 and 50, $K_m(i,j)$ in the case of $B_0$ and $B_m$ being linearly dependent is expressed by the following expression with reference to the basic property (2) of the M-sequence:

$$K_m = (i,j) = \begin{cases} q^{k-1} - 1, & (i,j) = (0,0) \\ q^{k-1}, & (i,j) = [i, \bmod_{q-1}(i + r)] \\ & i = 1, 2, \ldots, q - 1 \\ 0 & \text{otherwise} \end{cases} \qquad (52)$$

where, $m = m' = (q^{k-1} - 1)r/(q-1)$ (r = 1, 2, ..., q−2), and $\bmod_{q-1}$ is a process operation modulo q−1 and is expressed as q−1 when the result is 0.

The case of $B_0$ and $B_m$ being linearly independent will now be considered.

Since the mutually linearly independent vectors can be the basic vectors of the linear vector space, $K_m(i,j)$ regarding $B_0$ and $B_m$ are the same as those between the basic vectors. This is because they possess an identical property, when the vectors are basic vectors.

The basic vectors $v_i$ (i = 1, 2, ..., k) are the column vectors of the matrix g of expression 37, as indicated in the basic property (6) of the M-sequence. On the other hand, the matrix g has the arrangement of the column vectors of the N $(=q^k-1)$-number of k-dimensional vectors $\alpha, \alpha^2, \ldots, \alpha^N$ having the elements of GF(q) as components. Since $\alpha$ is the primitive element of GF($q^k$), $\alpha, \alpha^2, \ldots, \alpha^N$ are all mutually different vectors. Thus, $\alpha, \alpha^2, \ldots, \alpha^N$ can one-by-one correspond to any one of the N $(=q^k-1)$-number of vectors formed by arranging a k-number of elements picked up from the q-number of elements of GF(q) except the zerovector. From this, it is appreciated that in the combination of arbitrary basic vectors $v_x, v_y$ ($x \neq y$), $K_m(i,j)$ is equal to the number of the permutations arranged by the (k−2)-number of elements picked up from the q-number of the elements of GF(q).

From the above-mentioned consideration, in the case of $B_0$ and $B_m$ being linearly dependent, $K_m(i,j)$ can be obtained as indicated by the following expression, independent of m:

$$K_m(i,j) = \begin{cases} q^{k-2} - 1 & \text{(when } (i,j) = (0,0)) \\ q^{k-2} & \text{(otherwise)} \end{cases} \qquad (53)$$

where, m=1, 2, ..., N−1, and $m \neq m' = (q^{k-1}-1)r/(q-1)$ (r=1, 2, ..., q−2).

By substituting expressions 52 and 53 for expression 47, the following expression is obtained:

$$\rho(m) =$$

-continued $$\begin{cases} \left[ (q^{k-1} - 1) z_0{}^* z_0 + q^{k-1} \sum_{i=0}^{q-1} z_i{}^* z_{mod_{q-1}(i+r)} \right] / \\ \left[ q^{k-1} \sum_{i=0}^{q-1} |z_i|^2 - |z_0|^2 \right] \\ [m = (q^k - 1)r/(q-1)(r = 1, \ldots, q-2)] \\ \left[ (q^{k-2} - 1) z_0{}^* z_0 + q^{k-2} \sum_{i=0}^{q-1} \sum_{j=0}^{q-1} z_i{}^* z_j \right] / (i,j) \neq (0,0) \\ \left[ q^{k-1} \sum_{i=0}^{q-1} |z_i|^2 - |z_0|^2 \right] \text{(otherwise)} \end{cases}$$ (54)

(55)

Since the condition under which the sequence $\{\theta_n\}$ is an orthogonal sequence is $\rho(m)=0$ $(m=1, 2, \ldots, N-1)$, the following expressions are obtained by setting the right side of expressions 54 and 55 at 0:

$$(q^{k-1} - 1) z_0{}^* z_0 + q^{k-1} \sum_{i=0}^{q-1} z_i{}^* z_{mod(i+r)} = 0$$ (56)

$(r = 1, 2, \ldots, q-2)$ $$(q^{k-2} - 1) z_0{}^* z_0 + q^{k-2} \sum_{i=0}^{q-1} \sum_{j=0}^{q-1} z_i{}^* z_j = 0$$ (57)

$(i,j) \neq (0,0)$

Since expressions 56 and 57 are nothing but expressions 31 and 30, the foregoing prove that the sequence $\{\theta_n\}$ is an orthogonal sequence.

An example of the solution of the simultaneous equations 30 and 31 of the embodiment will now be described.

The simultaneous equations 30 and 31 of the proposition contain a q-number of unknown numbers $z_0, z_1, \ldots, z_{q-1}$. Since the number of equations is $q-1$, on the other hand, the solution of the simultaneous equations 30 and 31 is an indefinite solution. The solution can be obtained by setting one of the unknown values $z_0$ through $z_{q-1}$ as a constant. Herein $z_0$ is set as a constant $(=C)$. In this case, if $z_0=C=0$, a trivial solution of $z_1=z_2=\ldots=z_{q-1}=0$ is obtained, but this trivial solution has no physical importance and thus C is set to $C \neq 0$. For $z_1, \ldots, z_{q-1}$, further, a change of variables is performe as follows:

$$x_i = z_{i+1}/C (i=0, 1, \ldots, q-2)$$ (58)

Then, the simultaneous equations 30 and 31 are expressed by the following expressions:

$$q^{k-2} \left( 1 + \sum_{i=0}^{q-2} x_i{}^* \right) \left( 1 + \sum_{j=0}^{q-2} x_j \right) = 1$$ (59)

$$q^{k-1} \sum_{i=0}^{q-2} x_i{}^* x_{i+r} = 1 - q^{k-1}$$ (60)

$(r = 1, 2, \ldots, q-2)$

In expression 60, it is tacitly understood that the convolution integration $\Sigma$ is cyclic, and the symbol $\text{mod}_{q-1}(\cdot)$ representing the process operation modulo $q-1$ is omitted. Hereinbelow, the convolution integration is all to be cyclic and thus such a symbol is omitted.

First, the following expression is obtained by substituting expression 60 for expression 59:

$$\sum_{i=0}^{q-2} x_i{}^* x_i = \left\{ - \sum_{i=0}^{q-2} (x_i{}^* + x_i) \right\} + \{(q^k - 3q^{k-1} + 2)/q^{k-1}\}$$ (61)

Then, by setting $L_0 = q - 1$, the following discrete Fourier transformation is defined:

$$X_m = \sum_{i=0}^{L_0-1} x_i \cdot \exp(-j2\pi im/L_0)$$ (62)

$(m = 0, 1, \ldots, L_0 - 1)$ $|X_m|^2$ can be expressed as indicated by the following expression using the property of the discrete Fourier transformation:

$$|X_m|^2 = \sum_{i=0}^{L_0-1} x_i{}^* x_i + \sum_{r=1}^{L_0-1} \sum_{i=0}^{L_0-1} x_i{}^* x_{i+r} \cdot \exp(-j2\pi rm/L_0)$$ (63)

$(m = 0, 1, \ldots, L_0 - 1)$

The following expression is obtained by substituting expressions 60 and 61 for expression 63.

$$|X_m|^2 = - \sum_{i=0}^{L_0-1} (x_i{}^* + x_i) + \{(q^k - 3q^{k-1} + 2)/q^{k-1}\} +$$ (64)

$$\{(1 - q^{k-1})/q^{k-1}\} \cdot \sum_{r=1}^{L_0-1} \exp(-j2\pi rm/L_0)$$

$(m = 0, 1, \ldots, L_0 - 1)$

Further, $$X_0 = \sum_{i=0}^{L_0-1} x_i$$ (65)

$$\sum_{r=1}^{L_0-1} \exp(-j2\pi rm/L_0) = \begin{cases} L_0 - 1 & (m = 0) \\ -1 & (m = 1, \ldots, L_0 - 1) \end{cases}$$ (66)

Rewriting expression 63 using these relations 65 and 66, the following expressions are obtained.

$$|X_0|^2 = -(X_0 + X_0{}^*) + (-q^{k-1} + q)/q^{k-1}$$ (67)

$$|X_m|^2 = -(X_0 + X_0{}^*) + (q^k - 2q^{k-1} + 1)/q^{k-1}$$ (68)

$(m = 1, 2, \ldots, L_0 - 1)$

If expression 67 is deformed and arranged, it will be appreciated that $X_0$ is expressed by an arbitrary point on a circle having a center point of $(-1, 0)$ and a radius of $1/\sqrt{q^{k-2}}$, on the complex plane.

On the other hand, using the arbitrary content $K_m$ $(m = 1, 2, \ldots, q-2)$, $X_m$ $(m = 1, 2, \ldots, q-2)$ is feed from expression 68 as follows:

$$X_m = [-(X_0 + X_0{}^*) + (q^k - 2q^{k-1} + 1)/q^{k-1}]^{\frac{1}{2}} \cdot \exp(jK_m)$$ (69)

Figure 13B:
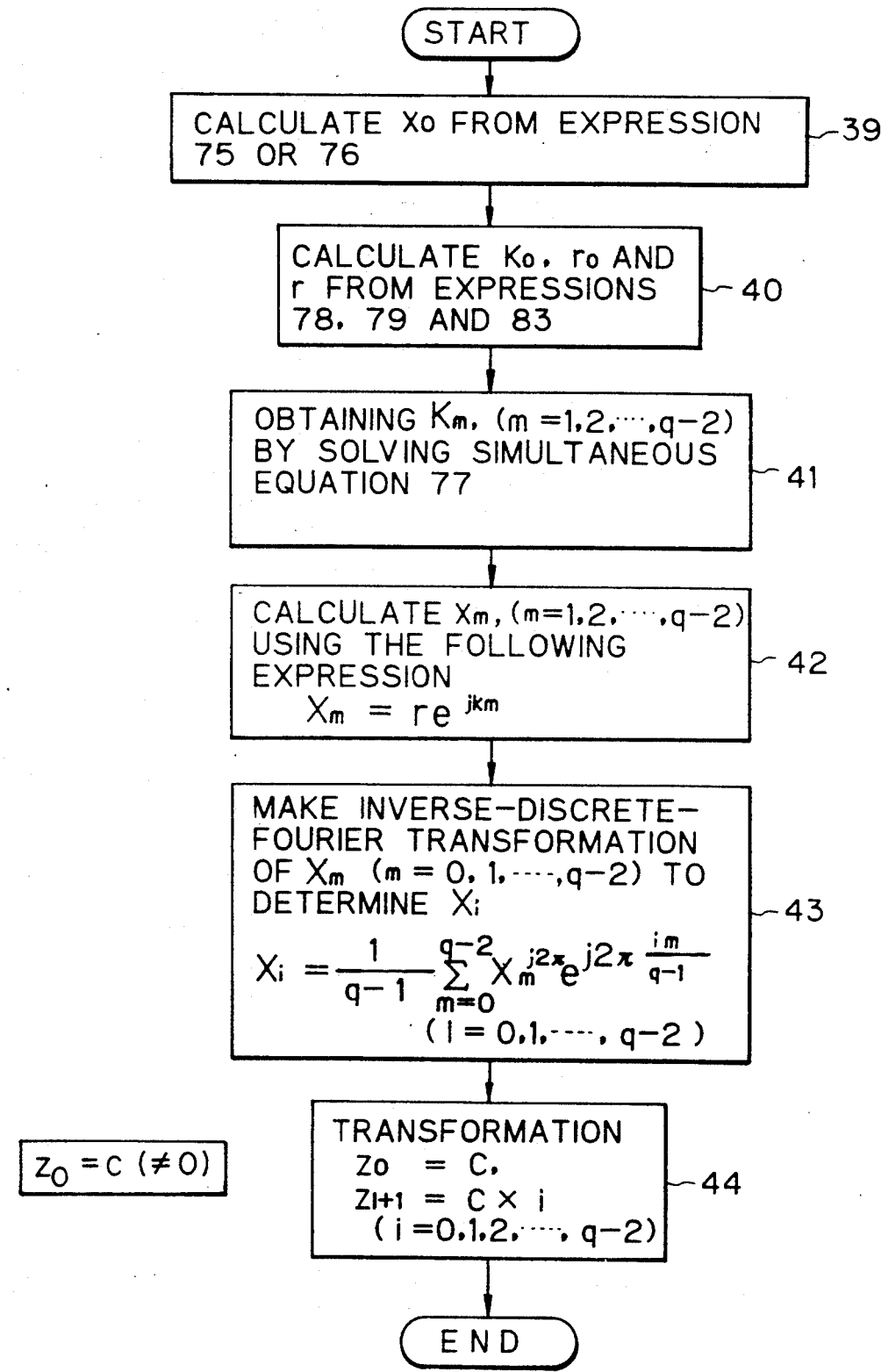

In the above-mentioned principle, the solution of the simultaneous equations 30 and 31 can be determined in accordance with the procedure of a flowchart shown in FIG. 13A.

The flow through the flowchart will be described.

Figure 13C:
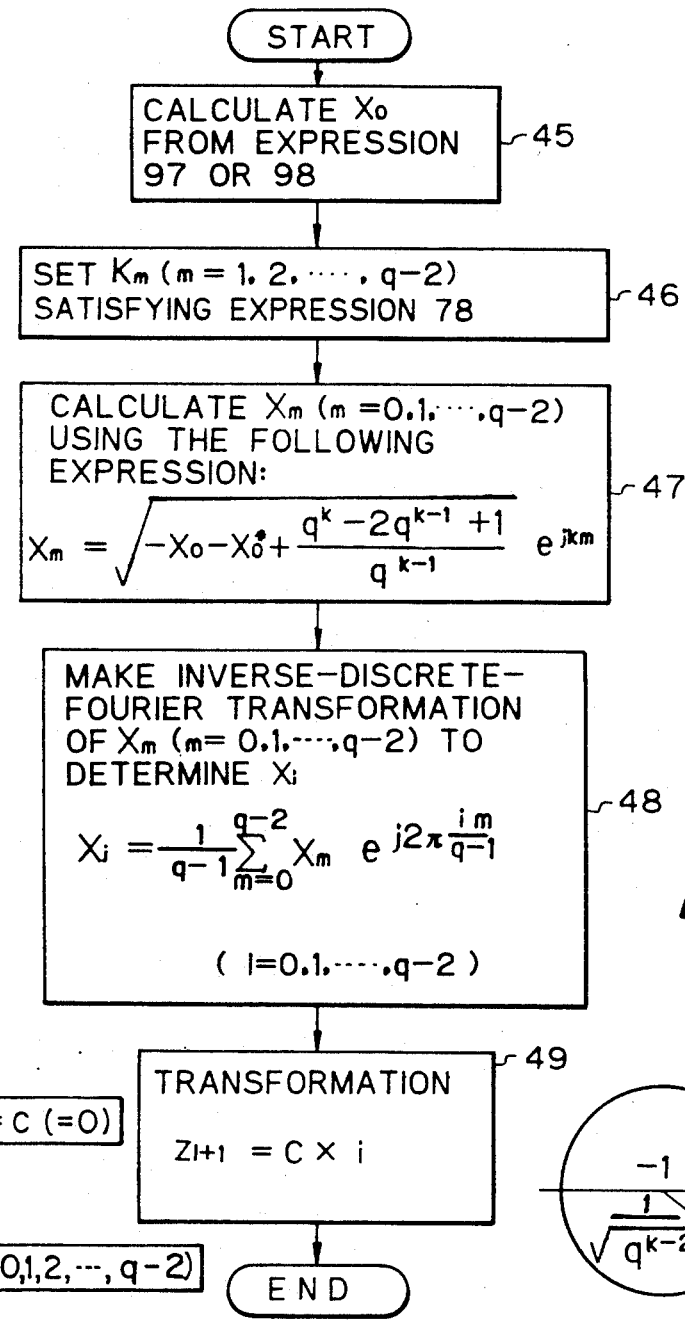
Figure 13D:
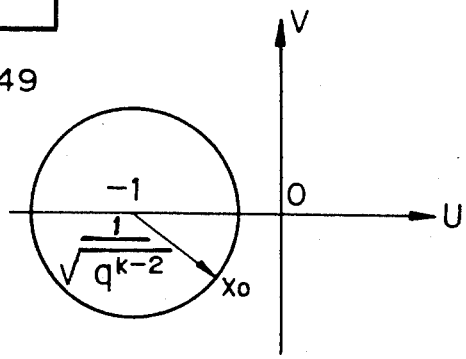
FIG. 13D is an illustration showing step 35 of the flowchart of FIG. 13A.

(a) At step 35, the value of one arbitrary point $X_0$ on a circumference having a center point of $(-1, 0)$ and a radius of $1/\sqrt{q^{k-2}}$ on the complex plane, as shown in FIG. 13D.

(b) As step 36, the value of $X_m$ (m=1, ..., q−2) is then set in accordance with expression 69, where $K_m$ is an artitrary real constant.

(c) As step 37, inverse-discrete-Fourier transformation of $X_o$ and $X_m$ (m=1, ..., q−2) is then performed to obtain $x_i$ (i=0, 1, ..., q−2) as follows:

$$x_i = \frac{1}{q-1} \sum_{m=0}^{q-2} X_m \cdot \exp\left(j2\pi \frac{im}{q-1}\right) \quad (70)$$

(d) At step 38, $z_i$ (i=0, ..., q−1) is then determined by multiplying $x_i$ with a complex constant value c ($\neq 0$).

$$z_0 = C \quad (71)$$

$$\begin{aligned}z_{i+1} &= Cx_i \quad (72)\\ &= \{C/(q-1)\}[X_0 + \{-(X_0 + X_0^*) + (1/q^{k-1})(q^k - 2q^{k-1} + 1)\}^{1/2}] \cdot \\ &\sum_{m=1}^{q-2} \exp j[K_m + 2\pi im/(q-1)]\\ (i &= 0, 1, \ldots, q-2)\end{aligned}$$

In expression 72, $X_o$ is a complex constant satisfying the following expression 73:

$$|X_o + 1|^2 = 1/q^{k-2} \quad (73)$$

As described above, the orthogonal sequence created by the orthogonal sequence generator of the present invention can be obtained by substituting the solution $z_i$ (i=0, ..., q−1) of simultaneous equations 30 and 31 for the component $a_n$ of the multi-element M-sequence from the generator 20, and thus the period of the orthogonal sequence is the same as the period N ($=q^{k-1}$) of the multi-element M-sequence, and each component of the orthogonal sequence has a multi-value of any one of $z_o, z_1, \ldots, z_{q-1}$. In this sense, the orthogonal sequence created by the orthogonal sequence generator of the present invention will be called a complex multi-value orthogonal sequence.

As a practical example of the complex multi-value orthogonal sequence created by the orthogonal sequence generator of the present invention, the case of q=3, k=3 and N=26 is shown below:

(11100202122102220010121120)

Figure 14A:
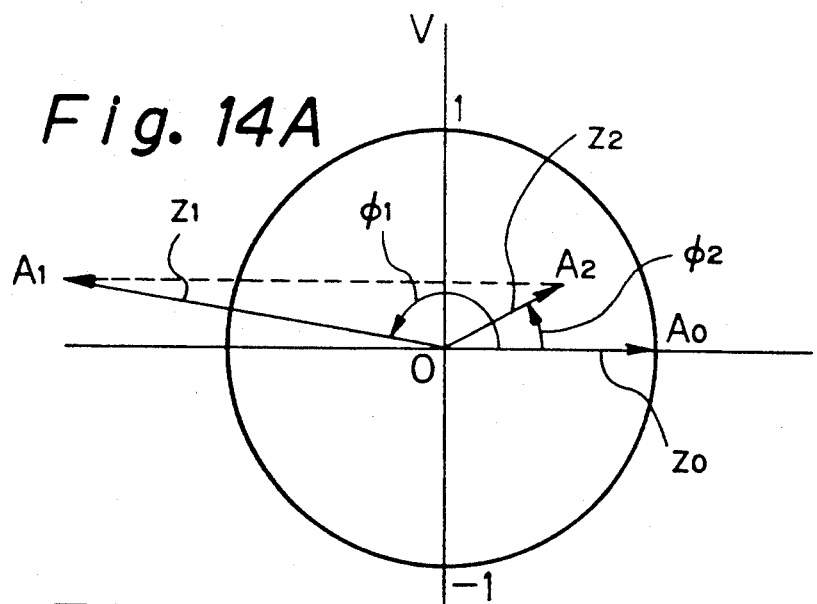
FIGS. 14A–14C are diagrams showing example vectors of components of the multi-value orthogonal sequences created by the generator of the invention.

The above example designates one period of the complex multi-value orthogonal sequence. Each figure (0, 1, 2) is a symbol and the corresponding complex-number $z_i$ is as follows:

$0 \rightarrow z_0 = 1.0$ $1 \rightarrow z_1 = -1.38 + j0.289 = 1.412 \exp(j168\pi/180)$ $2 \rightarrow z_2 = 0.382 + j0.289 = 0.479 \exp(j37\pi/180) \quad (74)$ FIG. 14A is a vector diagram of the components of the practical example of the above-described complex multi-value orthogonal sequence.

Modifications of the orthogonal sequence generator as described above will next be described.

As explained above, the solution $(z_0, z_1, \ldots, z_{q-1})$ of simultaneous equations 30 and 31 is represented by expressions 71 and 72 and the component substituting unit 21 converts the component $a_n$ of the multi-element M-sequence $\{a_n\}$ from the shift register 20 into one of $z_0, \ldots, z_{q-1}$.

These complex-numbers $z_0, z_1, \ldots, z_{q-1}$ contain $X_o$ and $K_m$ which are not uniquely determined, and thus there exists an infinite number of solutions depending upon the determination of the constants $X_o$ and $K_m$.

In one of the modifications, the component substituting unit 21 is so arranged that the absolute values $|z_0|, |z_1|, \ldots |z_{q-1}|$ of $z_0, z_1, \ldots, z_{q-1}$ are all equal by determining $X_o$ and $K_m$ uniquely, while in the other modification, the unit 21 is so arranged that the arguments of $z_0, z_1, \ldots, z_{q-1}$ are all equal by determining $X_o$ and $K_m$ uniquely.

As to the first modification, $X_o$ and $K_m$ with which all the absolute values of $z_0, z_1, \ldots, z_{q-1}$ are equal are given by the following expressions:

$$X_0 = \{(1-q^{k-1})/q^{k-1}\} + j\{(q^k-1)^{1/2}/q^{k-1}\} \quad (75)$$

$$X_0 = \{(1-q^{k-1})/q^{k-1}\} - j\{(q^k-1)^{1/2}/q^{k-1}\} \quad (76)$$

$$\gamma_0 \gamma \exp\{j(K_1 - K_0)\} + \gamma^2 \exp\{j(K_2 - K_1)\} + \ldots +$$
$$\gamma_0 \gamma \exp\{j(K_0 - K_{q-2})\} = 0$$

$$\gamma_0 \gamma \exp\{j(K_2 - K_0)\} + \gamma^2 \exp\{j(K_3 - K_1)\} + \ldots +$$
$$\gamma^2 \exp\{j(K_1 - K_{q-2})\} = 0$$

$$\vdots$$

$$\gamma_0 \gamma \exp\{j(K_{q-2} - K_0)\} + \gamma_0 \gamma \exp\{j(K_0 - K_1)\} + \ldots + \quad (77)$$
$$\gamma^2 \exp\{j(K_{q-3} - K_{q-2})\} = 0$$

where $$\tan K_0 = \pm (q^k - 1)^{1/2}/(1 - q^{k-1}) \quad (78)$$

$$\gamma_0 = \{(q^{k-1} + q - 2)/q^{k-1}\}^{1/2} \quad (79)$$

$$\gamma = \{(q^k - 1)/q^{k-1}\}^{1/2} \quad (80)$$

Simultaneous equations 77 can analytically be solved as shown below, when q is relatively small:

$$K_1 = \pi/2 + K_0 \text{ when } q = 3 \quad (81)$$

$$\left.\begin{aligned}K_1 &= \cos^{-1}(\gamma/2 \gamma_0) + K_0 \\ K_2 &= K_1\end{aligned}\right\} \text{when } q = 4 \quad \begin{array}{l}(82a)\\(82b)\end{array}$$

$$\left.\begin{aligned}K_1 &= \frac{\pi}{2} - \frac{1}{2}\cos^{-1}(-\gamma) + K_0 \\ K_2 &= K_0 \\ K_3 &= \frac{\pi}{2} + \frac{1}{2}\cos^{-1}(-\gamma) + K_0\end{aligned}\right\} \text{when } q = 5 \quad \begin{array}{l}(83a)\\(83b)\\(83c)\end{array}$$

If q is large, it will be difficult to analytically solve expression 77, but it will be possible to analytically solve it using a numerical analysis, such as well-known Newton-Raphson method and so on, and to obtain practical numerical values of $K_m$ (m=1, ..., q−2). Thus, the solution of the simultaneous equations 30 and 31 in which all the absolute values are equal is determined in accordance with the procedure shown in FIG. 13B.

To obtain equal absolute values of $z_0, z_1, \ldots, z_{q-1}$ with $X_o$ and $K_m$ satisfying expressions 75 or 76 and 77 will be described below.

(a) First at step 39, $X_o$ is calculated from expression 75 or 76.

(b) At step 40, $K_o$, $\gamma_o$ and $\gamma$ are calculated from expressions 78–80.

(c) At step 41, by solving simultaneous equations 77, $K_m$ is obtained.

(d) At step 42, $X_m$ is calculated from the expression $X_m = \gamma \exp(jK_m)$.

(e) At step 43, $x_i$ is determined by the following inverse-discrete-Fourier transformation of $X_m$:

$$x_i = \{1/(q-1)\} \sum_{m=0}^{q-2} X_m \exp j2\pi im/(q-1) \quad (84)$$

$$(i = 0, 1, \ldots, q-2)$$

(f) Finally, at step 44, $z_{i+1}$ is obtained by the following transformation (expressions 71 and 72):

$$z_0 = C (\neq 0)$$

$$z_{i+1} = Cx_i (i=0,1,\ldots,q-2)$$

An explanation why the absolute values of $z_0, z_1, \ldots, z_{q-1}$ become equal when $X_o$ and $K_m$ satisfy expressions 75 or 76 and 77 is as follows.

The fact that the absolute values of $z_0, z_1, \ldots, z_{q-1}$ are equal is expressed as below, resulting from the relation between expressions 75 or 76 and 77.

From expressions 71 and 72, $$|x_i|^2 = \left|\frac{z_{i+1}}{C}\right|^2 = \left|\frac{z_0}{C}\right|^2 = 1 \quad (85)$$

$$(i = 0, 1, \ldots, q-2)$$

Thus, it is equivalent to the fact that the absolute values of $x_i$ ($i=0, 1, 2, \ldots, q-2$) are 1.

On the other hand, the left side, $|x_i|^2$, of expression 85 can be rewritten, using the relation of expression 70, as follow:

$$|x_i|^2 = \frac{1}{(q-1)^2} \sum_{m=0}^{q-2}\sum_{n=0}^{q-2} X_m X_n^* \cdot \exp\left(\frac{j2\pi im-n}{q-1}\right) \quad (86a)$$

$$= \frac{1}{(q-1)^2} \sum_{n'=0}^{q-2}\sum_{n=0}^{q-2} X_{n+n'} X_n^* \cdot \exp\left(\frac{j2\pi in'}{q-1}\right) \quad (86b)$$

The transformation from expression 86a to expression 86b utilizes the fact that $m = n + n'$, and the summation $\Sigma$ is cyclic. Both sides of expression 86b are then subjected to discrete-Fourier-transformation to obtain the following expression:

$$\sum_{i=0}^{q-2} |x_i|^2 \cdot \exp\left(\frac{-j2\pi im}{q-1}\right)$$

$$= \sum_{i=0}^{q-2} \frac{1}{(q-1)^2} \sum_{n'=0}^{q-2}\sum_{n=0}^{q-2} X_{n+n'} \cdot X_n^* \cdot \quad (87a)$$

$$\exp\left(\frac{j2\pi in'}{q-1}\right) \cdot \exp\left(\frac{-j2\pi im}{q-1}\right)$$

$$= \frac{1}{q-1} \sum_{n=0}^{q-2} X_{m+n} \cdot X_n^* \quad (87b)$$

The transformation from expression 87a to expression 87b utilizes the following relation:

$$\sum_{i=0}^{q-2} \exp\left(\frac{j2\pi i(n'-m)}{q-1}\right) = \begin{cases} q-1 & (n'=m) \\ 0 & (\text{otherwise}) \end{cases} \quad (88)$$

From expression 85, $|x_i|^2 = 1$ ($i=0, \ldots, q-2$), and then expression 87b can be expressed by the following expression:

$$\sum_{n=0}^{q-2} X_{m+n} \cdot X_n^* = \begin{cases} (q-1)^2 & (m=0) \\ 0 & (m=1,2,\ldots,q-2) \end{cases} \quad (89)$$

Whereupon, if $$X_0 = \gamma_0 \exp(jK_0) \quad (90)$$

$$X_m = \gamma \exp(jK_m)(m=1,2,\ldots,q-2) \quad (91)$$

then, expression 89 can be reformed as follows:

$$\gamma_0^2 + (q-2)\gamma^2 = (q-1)^2 \quad (92)$$

Thus, expression 77 is obtained.

On the other hand, the following relations are established by comparing expressions 67 and 68 with expressions 90 and 91, respectively:

$$\gamma_0^2 = -2\gamma_0 \cos K_0 + \frac{q - q^{k-1}}{q^{k-1}} \quad (93)$$

$$\gamma^2 = -2\gamma_0 \cos K_0 + \frac{q^k - 2q^{k-1} + 1}{q^{k-1}} \quad (94)$$

By simultaneously solving expressions 92, 93 and 94, expressions 78, 79 and 80 are obtained.

From the foregoing, it will be appreciated that $X_0$ and $K_m$ ($m = 1, 2, \ldots; q-2$) with which the absolute values of $z_0, z_1, \ldots, z_{q-1}$ are equal are given by expressions 75 or 76 and 77.

An microprocessor, for example the microcomputer in the component substituting unit 21 previously calculates such values of $X_0$ and $K_m$ from expressions 75 or 76 and 77, and in accordance therewith, and determines $z_0$, $z_1, \ldots, z_{q-1}$ so as to have the same absolute value. The obtained $z_0, z_1, \ldots, z_{q-1}$ are then preset into the component substituting unit 21 and then the unit 21 can generate such a orthogonal sequence components of which have the same absolute value, in accordance with the steps shown in FIG. 12.

A practical example of the orthogonal sequence created by the first modified orthogonal sequence generator is shown below, in the case of $q=3$, $k=3$ and $N=26$:

(11100202122102220010121120)

The above example indicates one period of the orthogonal sequence. Each figure (0, 1, 2) is a symbol and the corresponding complex-number $z_i$ is as follows:

$$0 \rightarrow z_0 = 1.0$$

$1 \to z_1 = j \cdot 1.0 = 1.0 \exp(j90\pi/180)$ $2 \to z_2 = -0.901 + j \cdot 0.433 = 1.0 \exp(j205.7\pi/180)$ (95)

Figure 14B:
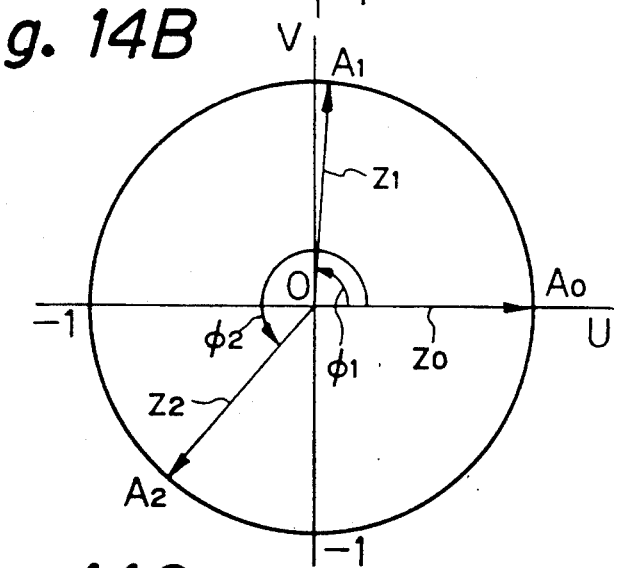

FIG. 14B is a component vector diagram of an example of the orthogonal sequence generated by the modification. As shown in FIG. 14B, the absolute values of the components of the created orthogonal sequence are identical with another, and in this sense this orthogonal sequence can be called as a polyphase orthogonal sequence. Thus, with the orthogonal sequence generator of the first modification can create a polyphase orthogonal sequence as a special case.

With the conventional polyphase orthogonal sequence proposed by Frank, the number of phases is given by $\sqrt{N}$ when the period is N, whereas with the orthogonal sequence of the invention it is given by $k\sqrt{N+1}$, thereby bringing forth the effect that even when the period N is large the number of phases is small, in comparison with the conventional polyphase orthogonal sequence.

The second modification will next be explained. $X_0$ and $K_m$ with which all the arguments of $z_0, z_1, \ldots, z_{q-1}$ of an orthogonal sequence are the same are given by the following expressions:

$$X_o = -1 + \frac{1}{\sqrt[k]{q^k - 2}}$$ (96)

or $$X_o = -1 - \frac{1}{\sqrt[k]{q^k - 2}}$$ (97)

$$K_m = -K_{-m} = -K_{q-1-m}$$ (98)

$(m = 1, 2, \ldots, q-2)$

Expression 98 shows that $K_m$ is an odd function represented by $K_m = m/(q-1)$ for example.

$z_0, z_1, \ldots, z_{q-1}$, which are the solution of the simultaneous equations 30 and 31 and have the same argument, are obtained in accordance with a flow shown in FIG. 13C. That is:

(a) At step 45, $X_0$ is calculated from expression 96 or 97.

(b) At step 46, $K_m$ satisfying expression 98 is calculated and set.

(c) At step 47, using expression 69, $X_m$ is calculated as follows:

$$X_m = \sqrt{-X_o - X_o^* + \frac{q^k - 2q^{k-1} + 1}{q^{k-1}}}$$

(d) At step 48, $X_m$ is substituted with $x_i$ by the inversediscrete-Fourier transformation.

$$x_i = \frac{1}{q-1} \sum_{m=0}^{q-2} X_m \cdot \exp\left(\frac{j2\pi im}{q-1}\right)$$

$(i = 0, 1, \ldots, q-12)$ (e) At step 49, $z_0$ is set to C ($\neq 0$) as expression 71 and by multiplying $x_i$ by C, $z_{i+1}$ is obtained as expression 72.

$z_0 = C$ $z_{i+1} = Cx_i (i = 0, 1, \ldots, q-2)$

The following is an explanation why the arguments of $z_0, z_1, \ldots, z_{q-1}$ are the same if $X_0$ and $K_m$ satisfy expressions 96 or 97 and 98.

When the arguments of $z_0, z_1, \ldots, z_{q-1}$ are the same, all of $z_1/z_0, z_2/z_0, \ldots, z_{q-1}/z_0$ are real numbers. From expressions 71 and 72, $$x_i = z_{i+1}/C = z_{i+1}/z_0$$ (99)

$(i=0,1,\ldots,q-2)$

Accordingly, the fact that the arguments of $z_0, z_1, \ldots, z_{q-1}$ are the same is equal to that $z_{i+1}/C$ is a real number. In order to satisfy that $z_{i+1}/C$ is a real number, it is necessary to satisfy the following relations in view of expression 72:

$X_o = $ a real number (100)

$$\sum_{m=1}^{q-2} \exp j\left(k_m + \frac{2\pi im}{q-1}\right) = \text{a real number}$$ (101)

When $X_0$ is a real number, expression 75 or 76 is obviously fed from expression 73.

The left side of expression 101 can be rewritten as follows:

$$\sum_{m=1}^{q-2} \exp j\left(K_m + \frac{2\pi im}{q-1}\right) = \sum_{m=1}^{q-2} \cos\left(K_m + \frac{2\pi im}{q-1}\right) +$$

$$j \sum_{m=1}^{q-2} \sin\left(K + \frac{2\pi im}{q-1}\right)$$ (102)

Accordingly, if $K_m$ is an odd function as represented by expression 98, $$\sin\left(K_m + \frac{2\pi im}{q-1}\right)$$

is also an odd function with regard to m and thus $$\sum_{m=0}^{q-2} \sin\left(K_m + \frac{2\pi im}{q-1}\right) = 0.$$

Therefore, it is understood that when $K_m$ is an odd function, expression 101 is satisfied.

From the foregoing, it will be appreciated that $X_0$ and $K_m$ ($m=1, 2, \ldots, q-2$) with which the argument values of $z_0, z_1, \ldots, z_{q-1}$ are equal are given by expressions 96 or 97 and 98.

$z_0, z_1, \ldots, z_{q-1}$ having the same argument are determined in response to the constants $K_m$ and $X_0$ obtained in the above manner, and are preset into the component substituting unit 21. Accordingly, the unit 21 can provide such a orthogonal sequence components of which have the same argument, in line with the flow shown in FIG. 12.

A practical example of the orthogonal sequence created by the second modification is shown as follows, where $q=3$, $k=3$ and $N=26$:

(11100202122210222001012112O)

This example indicates one period of the orthogonal sequence. Each figure (0, 1, 2) is a symbol and the corresponding complex-number $z_i$ is as follows:

$0 \rightarrow z_0 = 1.0$ $1 \rightarrow z_1 = -0.911$ $2 \rightarrow z_2 = 0.488$ (103)

Figure 14C:
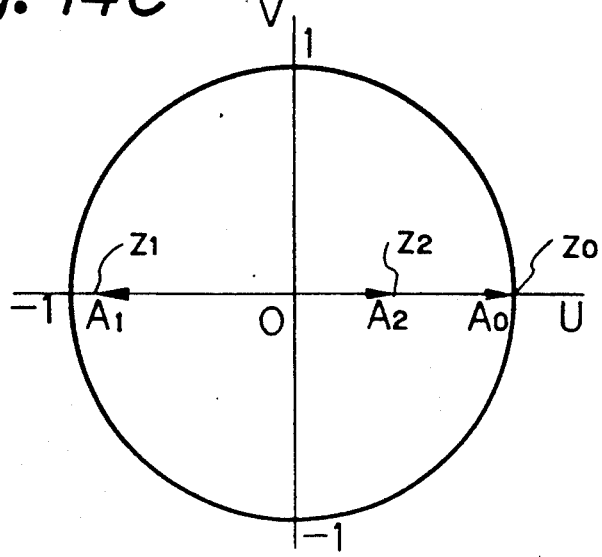

FIG. 14C shows an example vector diagram of the orthogonal sequence generated by the second modification. Since all the components of this orthogonal sequence are real numbers, it can be called as a real multi-value orthogonal sequence which is a special case of a complex multi-value orthogonal sequence.

An embodiment of a radar system of this invention will now be described.

Figure 15:
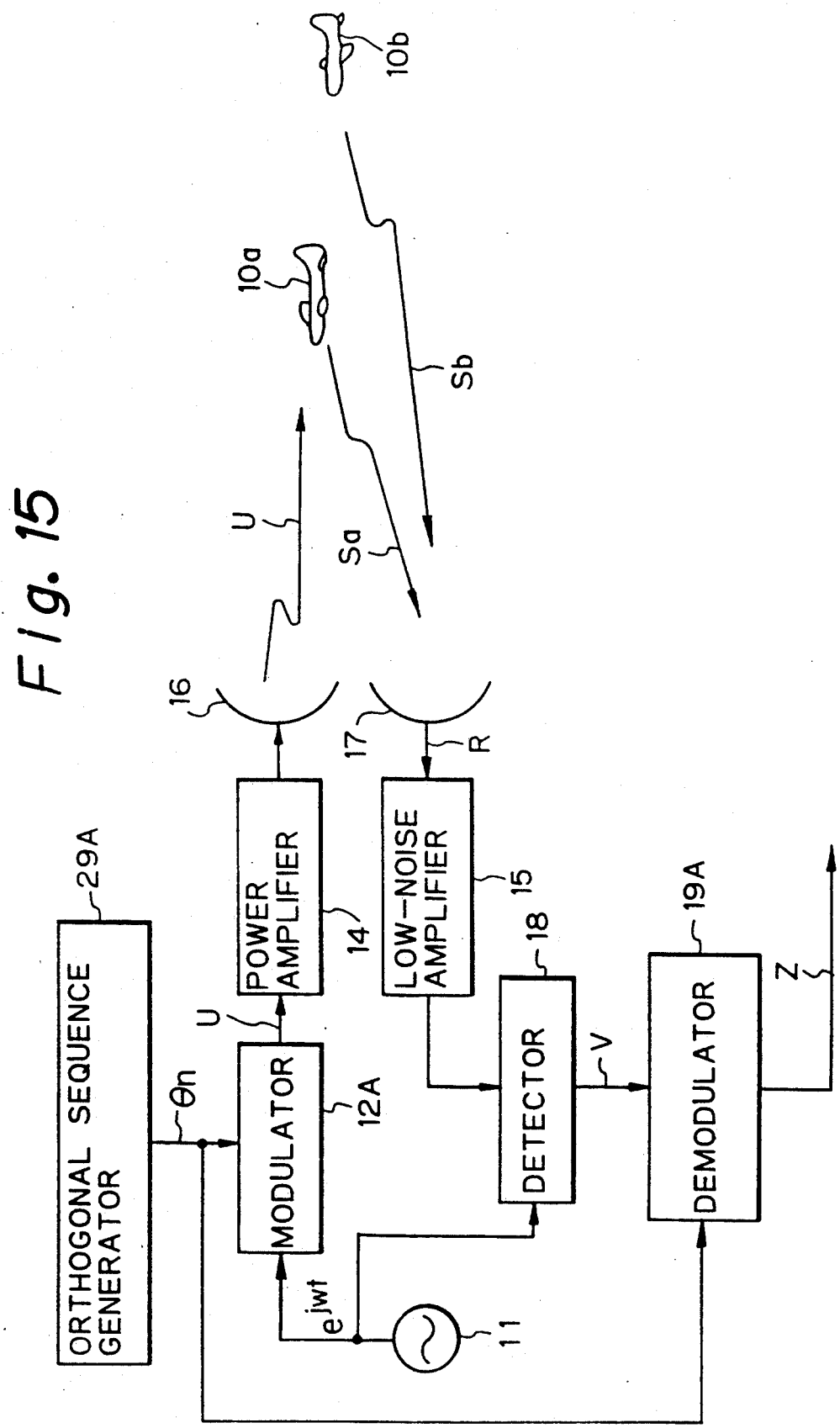
FIG. 15 is a schematic representation of a radar system including the orthogonal sequence generator of the invention.

FIG. 15 is a schematic representation of the embodiment of the radar system provided with an orthogonal sequence generator. The radar system shown in FIG. 15 employs a complex multi-value orthogonal sequence generator 29 arranged as in FIG. 11, a modulator 12A which code-modulates a sinusoidal wave signal $\cos\omega t$ using a complex multi-value orthogonal sequence $\{\theta_n\}$ from the generator 29 and a demodulator 19A which performs the correlation process of its input signal and the orthogonal sequence $\{\theta_n\}$ to obtain a demodulated signal $Z(k)$.

Figure 1:
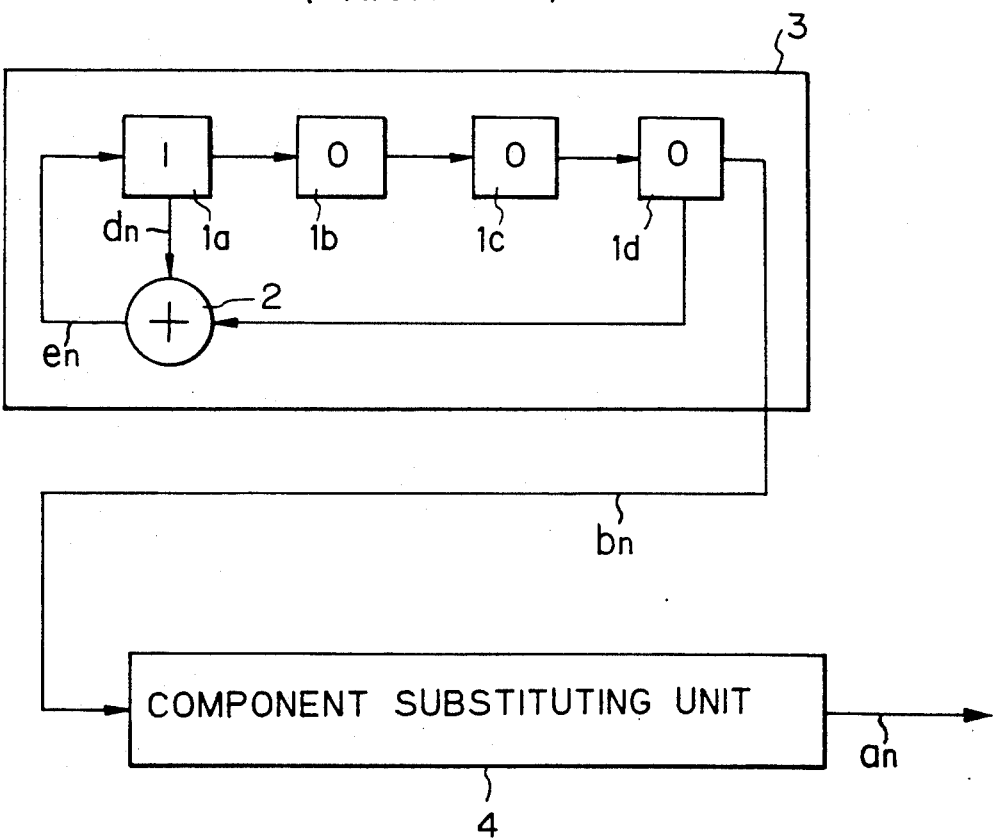
FIG. 1 is a schematic representation of a conventional complex two-value orthogonal sequence generator.
Figure 2:
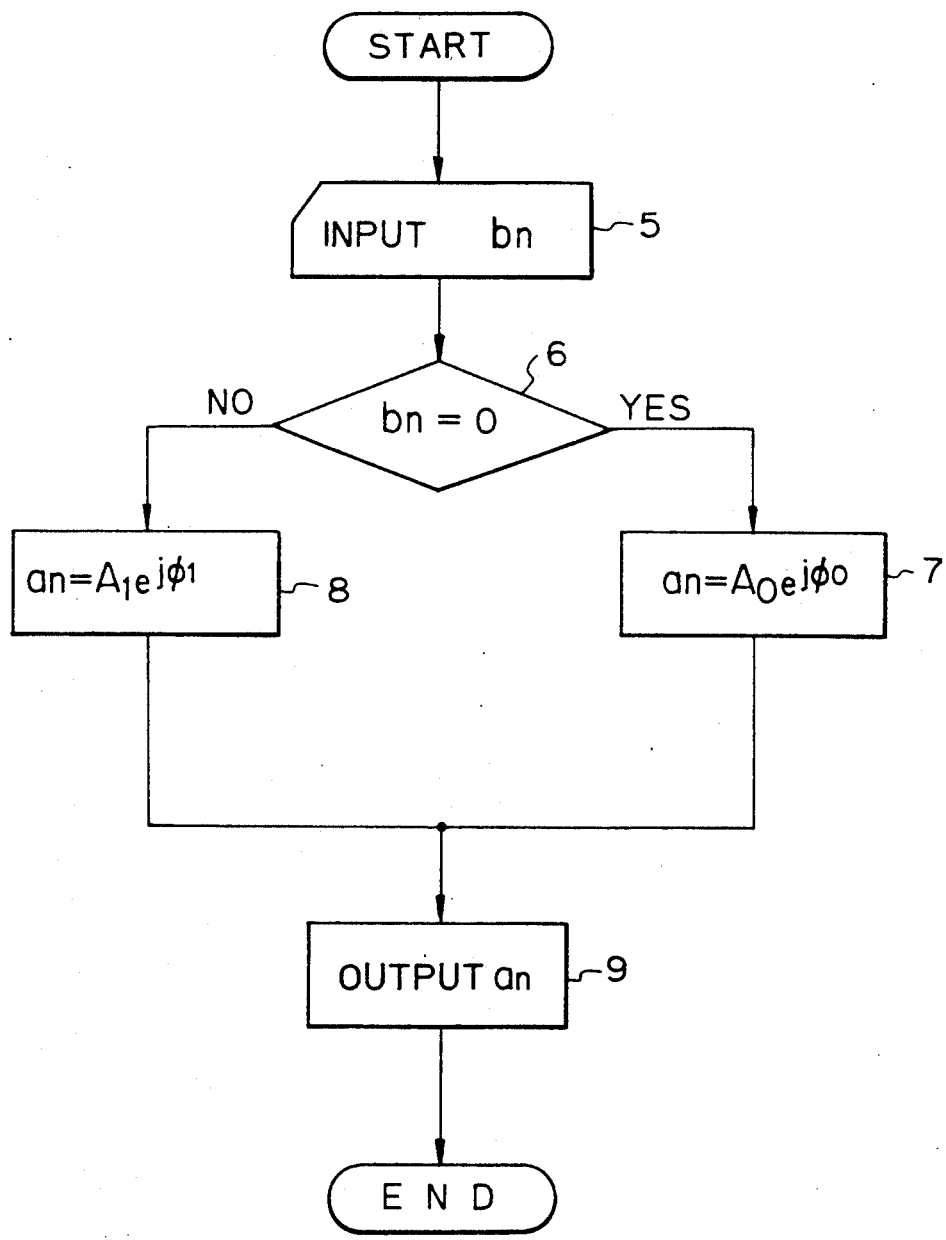
FIG. 2 is a flowchart showing the operation of the component substituting unit of the conventional generator shown in FIG. 1.
Figure 3:
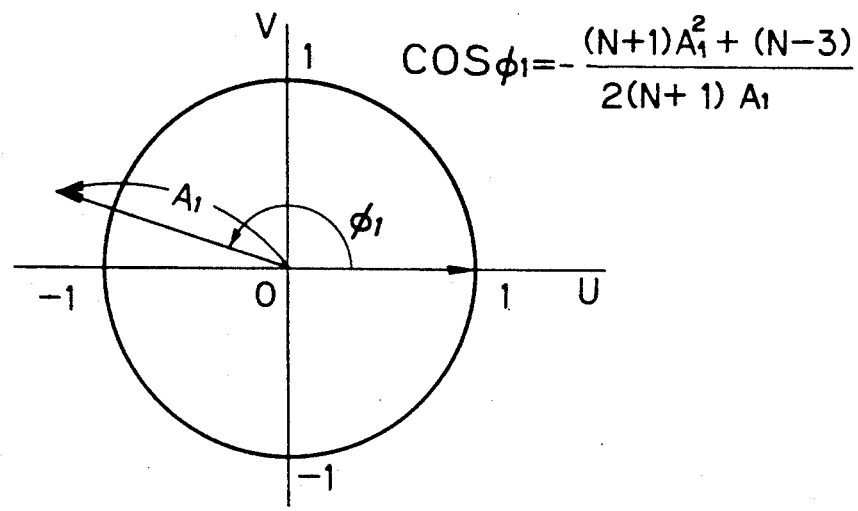
FIG. 3 is a diagram showing example vectors of components of the conventional complex two-value orthogonal sequence.
Figure 5:
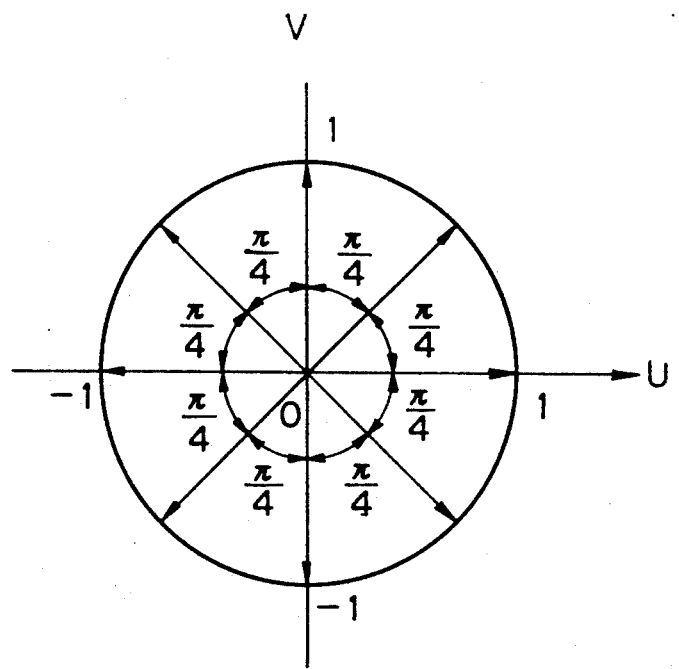
FIG. 5 is a diagram showing example vectors of components of the polyphase orthogonal sequence created in accordance with the flowchart shown in FIG. 4.
Figure 4:
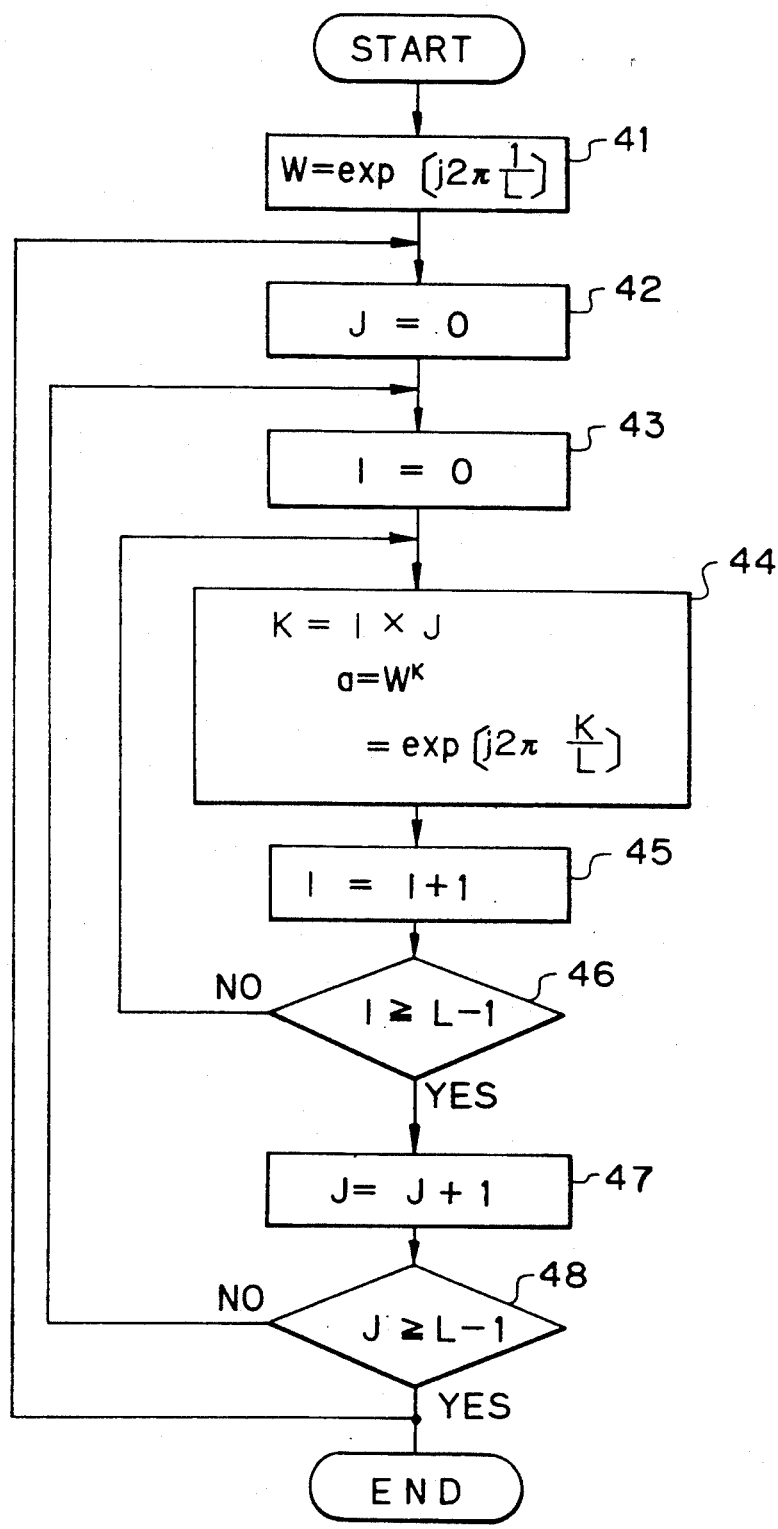
FIG. 4 is a flowchart showing the creation operation of an conventional polyphase orthogonal sequence.
Figure 6:
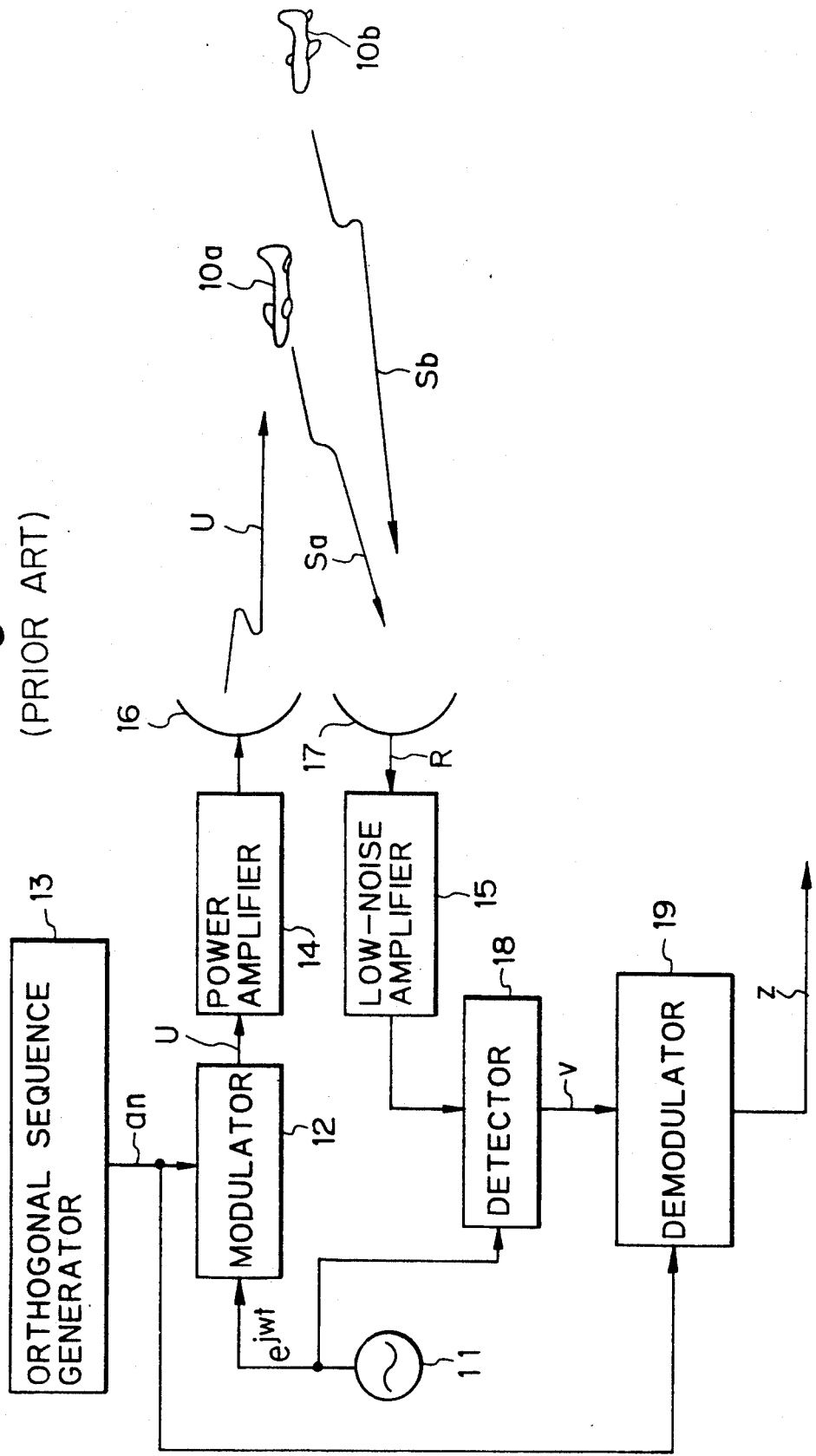
FIG. 6 is a schematic representation showing a radar system incorporating the conventional radar system.

The other components of the radar system are substantially the same as those of the prior system shown in FIG. 6. Accordingly, the operation of the radar system can be described using the component $\theta_n$ of the complex multi-value orthogonal sequence instead of the component $a_n$ of the complex two-value orthogonal sequence with reference to expressions 16a to 24 with respect to the respective signals already described in connection with the prior art, and thus description of the common parts will be omitted.

Figure 16A:
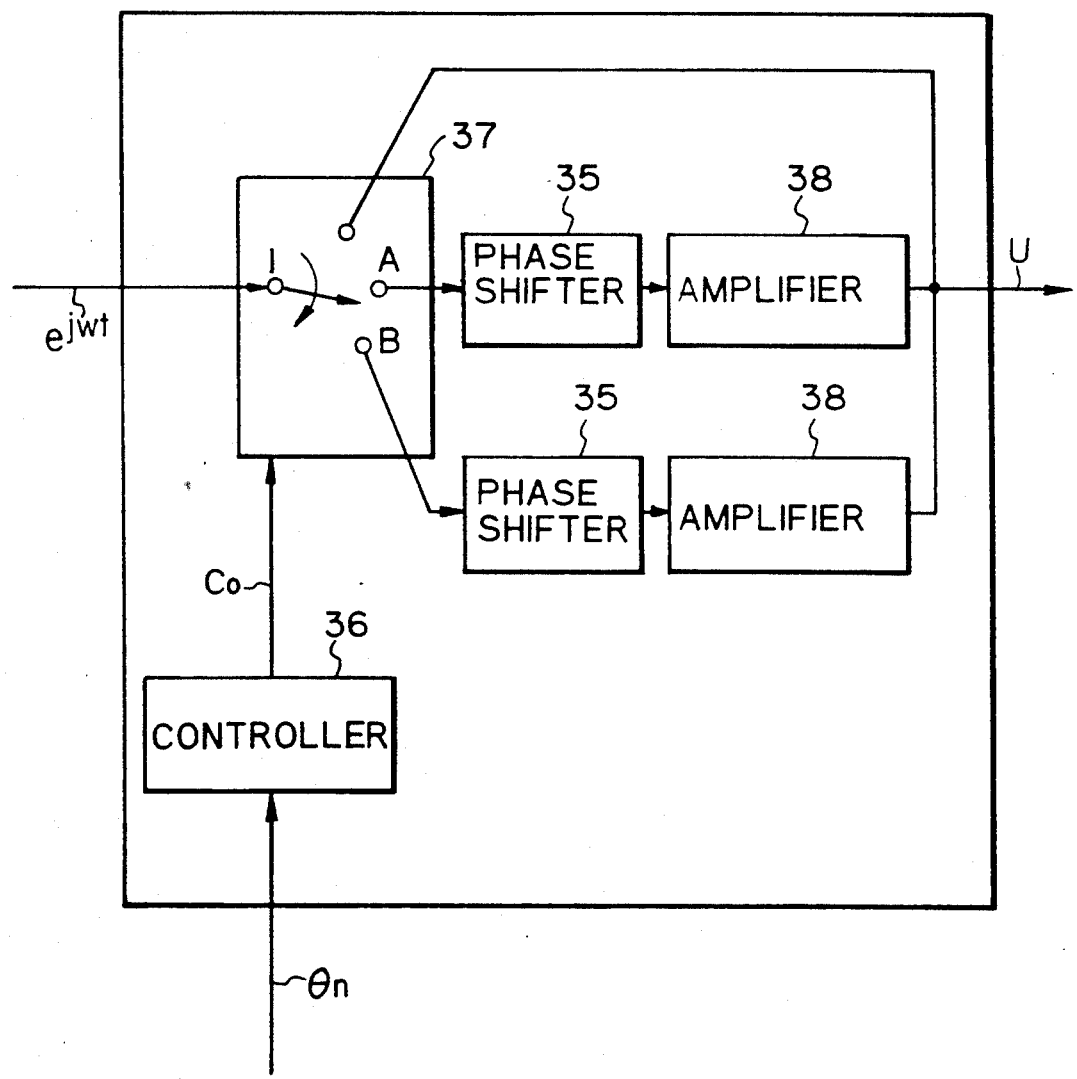
FIGS. 16A–16C are diagrams showing arrangements of the modulator shown in FIG. 15.

FIG. 16A shows an arrangement of the modulator 12A shown in FIG. 15. In this drawing, numeral 35 refers to phase shifters 36 to a control unit, 37 to a switching circuit and 38 to amplifiers.

If the code-modulated transmission signal $U(t)$ is referred to by $A_n \cos(\omega t + \phi_n)$, the absolute value and argument of the complex number taken by the component $\theta_n$ of the complex multi-value orthogonal sequence will respectively correspond to the amplitude $A_n$ and phase $\phi_n$ of the transmission signal.

$A_n$ and $\phi_n$ in the case of the complex three-value orthogonal sequence indicated by expression 74 are as follows:

$A_0 = 1, \quad \phi_0 = 0$ (104)

$A_1 = 1.412, \quad \phi_1 = 168\pi/180$ $A_2 = 0.479, \quad \phi_2 = 37\pi/180$ Two phase shifters 35 are adapted to advance by $\phi_1$ and $\phi_2$ the quantity of phase of the sinusoidal wave signal $e^{j\omega t}$ fed from the local oscillator 11 through the switching circuit 37, and two amplifiers 38 are adapted to amplify $A_1$ and $A_2$ times the amplitudes of the phase-shifted sinusoidal wave signal. The switching circuit 37 changes over the destination of the sinusoidal wave signal at every $\tau$ time interval and the operation thereof depends on a command signal $C_0$ provided from the control unit 36. The control unit 36 creates the command signal $C_0$ in accordance with the amplitude $A_n$ and argument, or phase $\phi_n$ of the component $\theta_n$ of the orthogonal sequence. For example, in the case of the amplitude being 1 and the phase being 0, the command signal $C_0$ is created so as to connect terminals I and O of the switching circuit 37, the case of the amplitude $A_1$ and the phase $\phi_1$, the command signal $C_0$ is created so as to connect the terminals I and A, and in the case of the amplitude $A_2$ and the phase $\phi_2$, the command signal $C_0$ is created so as to connect the terminals I and B.

In the above-mentioned radar system of this invention using the complex three-value orthogonal sequence, the number of change-overs of the phase and amplitude at the modulator 12A is three, and thus the number of channels comprising the phase shifters 35 and amplifiers 38 is two.

Generally, with the complex multi-value orthogonal sequence, the period N thereof is expressed by $q^k - 1$, and thus the number of change-overs of the phase and amplitude at the modulator is $q = (N+1)^{1/k}$. Since with the conventional polyphase orthogonal sequence, the period N thereof is expressed by $L^2$, the number of change-overs of the phase at the modulator is $q = \sqrt{N}$. Therefore, if the period N of the sequence is large, the number of change-overs of the phase at the modulator in the case of using the complex multi-value orthogonal sequence is reduced as compared to that in the conventional case, and the reduction of the number of phase shifters provided in the modulator makes it possible to simplify the construction of the modulator.

With respect to the demodulator 19A for performing the correlation process of the detection signal V input thereto from the detector 18 and the complex multi-value orthogonal sequence $\{\theta_n\}$, the coefficient of the correlation process is different from that of the conventional process using the complex two-value orthogonal sequence $\{a_n\}$. Thus, the demodulator 19A performs the correlation process expressed as the following expression 105, using the sampled detection signal V as indicated by expression 22 and the complex multi-value orthogonal sequence $\{\theta_n\}$ fed from the orthogonal sequence generator 29A, and then outputs the demodulated signal $Z(k)$.

$$Z(k) = \left( 1 / \sum_{n=0}^{N-1} |\theta_n|^2 \right) \cdot \sum_{n=0}^{N-1} \theta_n^* \cdot V_{(n+k)} \quad (105)$$

The demodulated signal $Z(k)$ indicated by expression 105 is expressed by the following expression, similar to expression 24, when the autocorrelation function of the complex multi-value orthogonal sequence $\{\theta_n\}$ is represented by $\rho_{OR}(m)$:

$Z(k) = \eta_a \exp(-j\omega\tau k_a)\rho_{OR}(k-k_a) + \eta_b \exp(-j\omega\tau k_b)\rho_{OR}(k-k_b)$ (106)

Figure 8A:
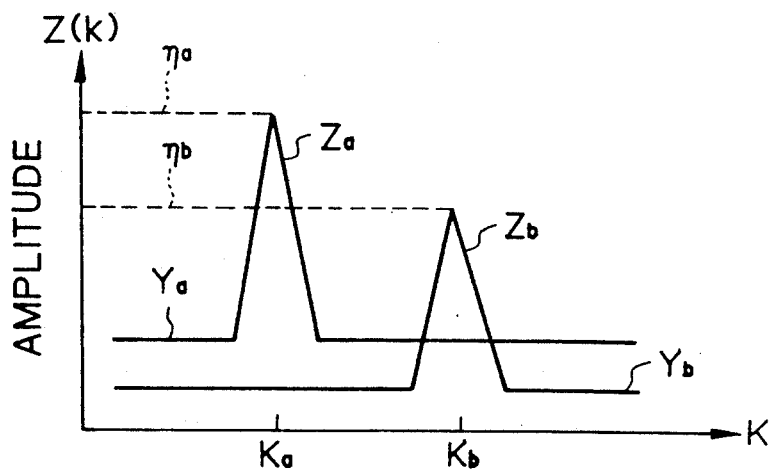
FIGS. 8A–8C are diagrams showing the waveforms of the demodulated signals of the radar system shown in FIG. 6.
Figure 8B:
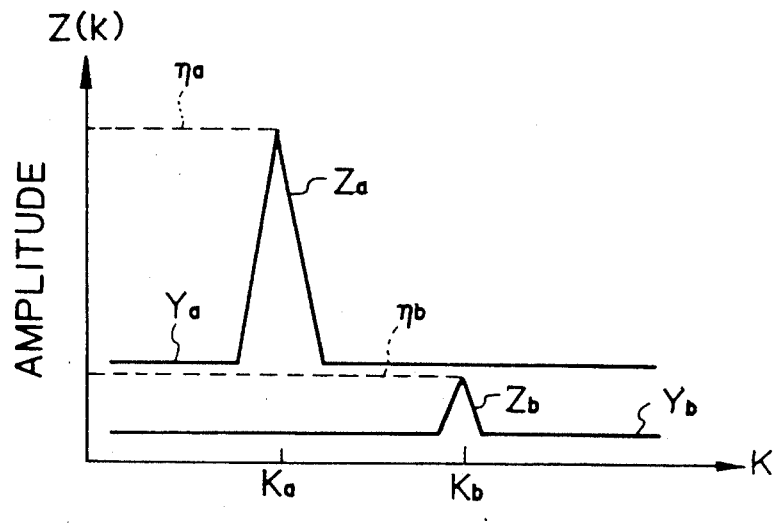
Figure 8C:
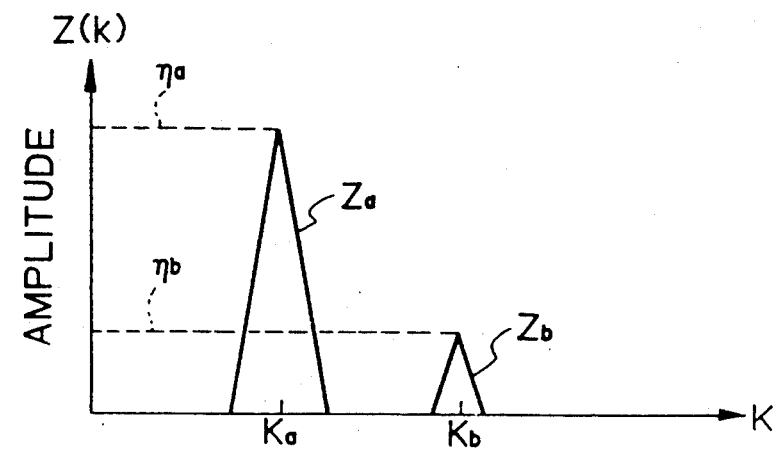
Figure 9:
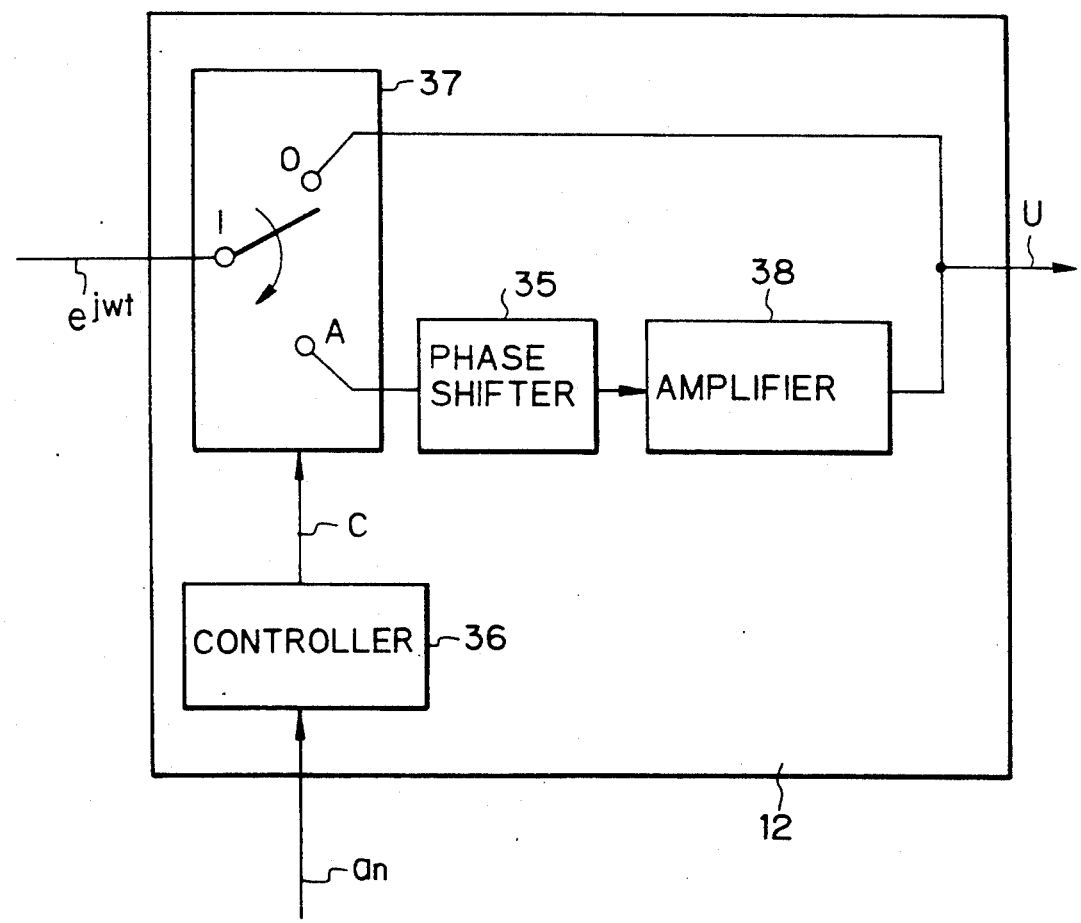
FIGS. 9 and 10 are diagrams showing examples of the modulator employed in the conventional radar system.
Figure 10:
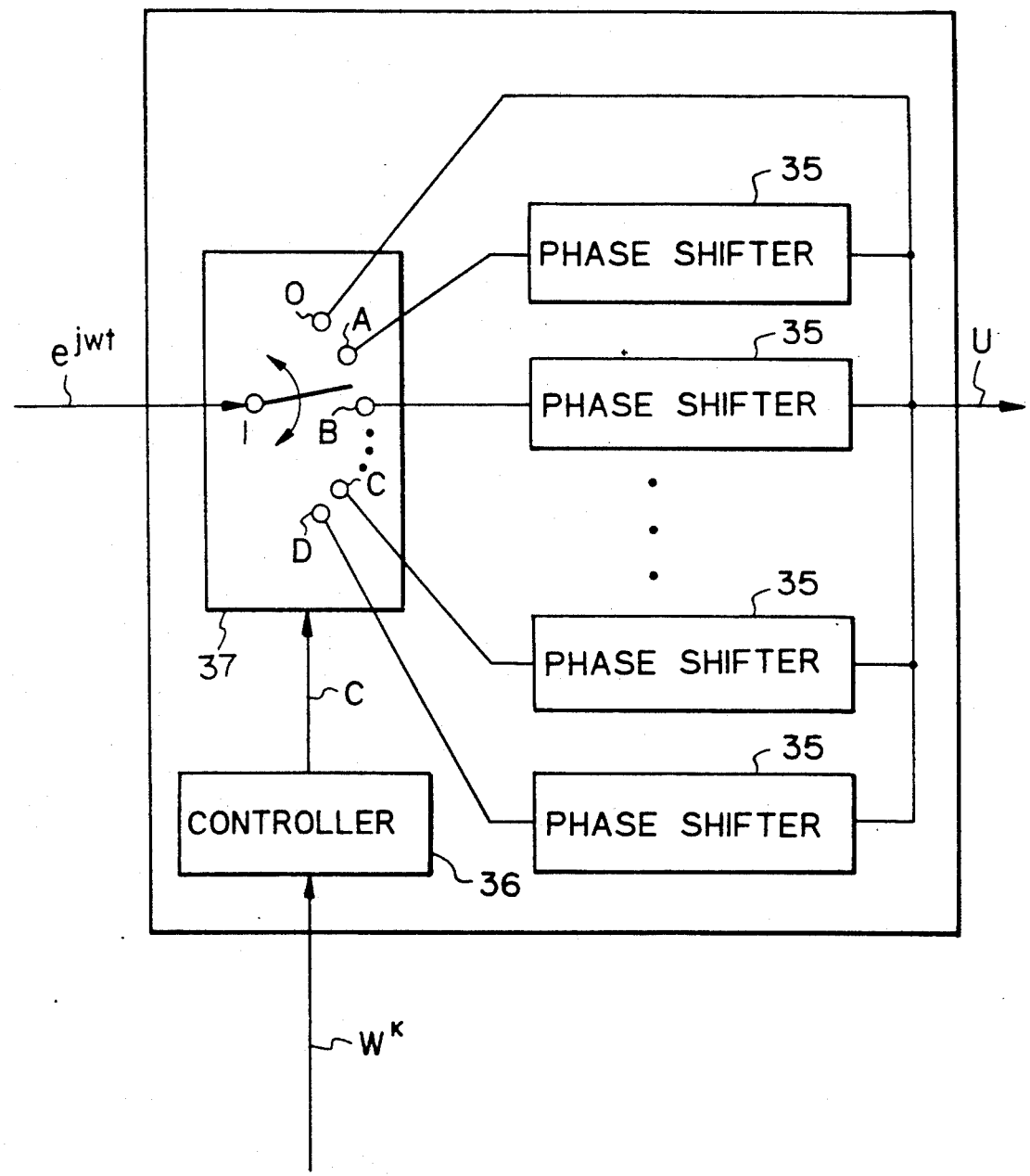

As described above, an autocorrelation function of a complex multi-value orthogonal sequence has a side lobe the magnitude of which is 0. Accordingly, when the complex multi-value orthogonal sequence $\{\theta_n\}$ is employed for the code-modulation of the radar system, such advantages as those in the prior art; even when there is a substantial difference between the radio-wave reflection intensities $\eta_a$ and $\eta_b$ on the adjacent two targets, the two-target signals $Z_a$ and $Z_b$ can be detected from the demodulated signal $Z(k)$ without the main lobe of the smaller-magnitude signal $Z_b$ being covered by any side lobe of the larger-magnitude signal $Z_a$, as shown in FIG. 8C.

Further, in the radar system of this invention, since the sinusoidal wave signal $e^{j\omega t}$ is code-modulated with the complex multi-value orthogonal sequence instead of a complex two-value orthogonal sequence, the detection, by any other electronic device, of the angular frequency $\omega$ of such a transmission signal will be extremely difficult.

That is: The transmission signal U(t) obtained by code-modulating the sinusoidal wave signal with the complex multi-value orthogonal sequence $\{\theta_n\}$ can be expressed by the following expression from expression 16a.

$$U(t) = \sum_{n=-\infty}^{\infty} \text{rect}\left(\frac{t-n\tau}{\tau}\right)\theta_n \exp(j\omega t) \quad (107)$$

where, $\theta_n = A_n \exp(j\phi_n)$. Thus, the real component of U(t) of expression 107 can be expressed by the following expression:

$$U(t) = \sum_{n=-\infty}^{\infty} \text{rect}\left(\frac{t-n\tau}{\tau}\right) A_n \cos(\omega t + \phi_n) \quad (108)$$

Now, assuming that any other electronic device has received such a code-modulated transmission signal U(t) and U(t) is square-detected thereat to identify the angular frequency $\omega$ of U(t). If the output signal of a square detection unit referred to by Y(t), then Y(t) is expressed by the following expressions:

$$Y(t) = U^2(t)$$

$$= \sum_{n=-\infty}^{\infty} \text{rect}\left(\frac{t-n\tau}{\tau}\right) A_n^2 \cos^2(\omega t + \phi_n) \quad (109a)$$

$$= \sum_{n=-\infty}^{\infty} \text{rect}\left(\frac{t-n\tau}{\tau}\right) \frac{A_n^2}{2} \{1 + \cos 2(\omega t + \phi_n)\} \quad (109b)$$

In the case of the complex multi-value orthogonal sequence, the value of $2\phi_n$ never takes both the values of 0 and $2\pi$, in contrast to the case previously described in connection with the conventional radar system using the complex two-value orthogonal sequence.

For example, in the case of the example indicated by expression 104, $2\phi_n$ takes one of the values 0, $168\pi/90$ or $37\pi/90$. Thus, Y(t) is not a sinusoidal wave, but a signal equivalent to that code-modulated by the code $A_n^2 \exp(j2\phi_n)$ to cause the spectrum to be expended. Therefore, even when the frequency components of Y(t) are analyzed by a spectral analyzer, no sharp peak is detected in the waveform of the output thereof. Accordingly, it is extremely difficult for other electronic devices to detect the angular frequency $\omega$ of the transmission signal from the radar system using the complex multi-value orthogonal sequence in comparison with the prior art employing the complex two-value orthogonal sequence.

In the polyphase orthogonal sequence as shown in the prior example, the period N is expressed by $N=L^2$ (L: an integer equal to or more than 2), and if N is determined as a certain number, the polyphase orthogonal sequence having the period N exists only in a singular form. On the contrary, in the complex multi-value orthogonal sequence regarding the present invention, the period N can be expressed by $N=q^k-1$ (q: a prime number or power thereof, k: an integer equal to or more than 2), and if N is determined as a certain number, the complex multi-value orthogonal sequence having the period N exits in a plural form. The number of the sequences having the period N is equal to the number of k-degree primitive polynominals in GF(q). Referring to "Code Theory (Third Edition)" mentioned above, the number of the primitive polynominals is four in the case of q=3 and k=4, for example. Thus, there exist four complex multi-value orthogonal sequences having the period of N=80.

Because of the existence of a plurality of complex multi-value orthogonal sequences having the period N, if those sequences are utilized while being changed from one to another, it will be extremely difficult to detect the code-modulated transmission signal U(t) with any other electronic device, in comparison with the case of the prior polyphase orthogonal sequence.

Next, arrangements of the modulator 12A of the radar system, shown in FIG. 15, respectively using the first and second modifications of the multi-value orthogonal sequence generators will be described.

Figure 16B:
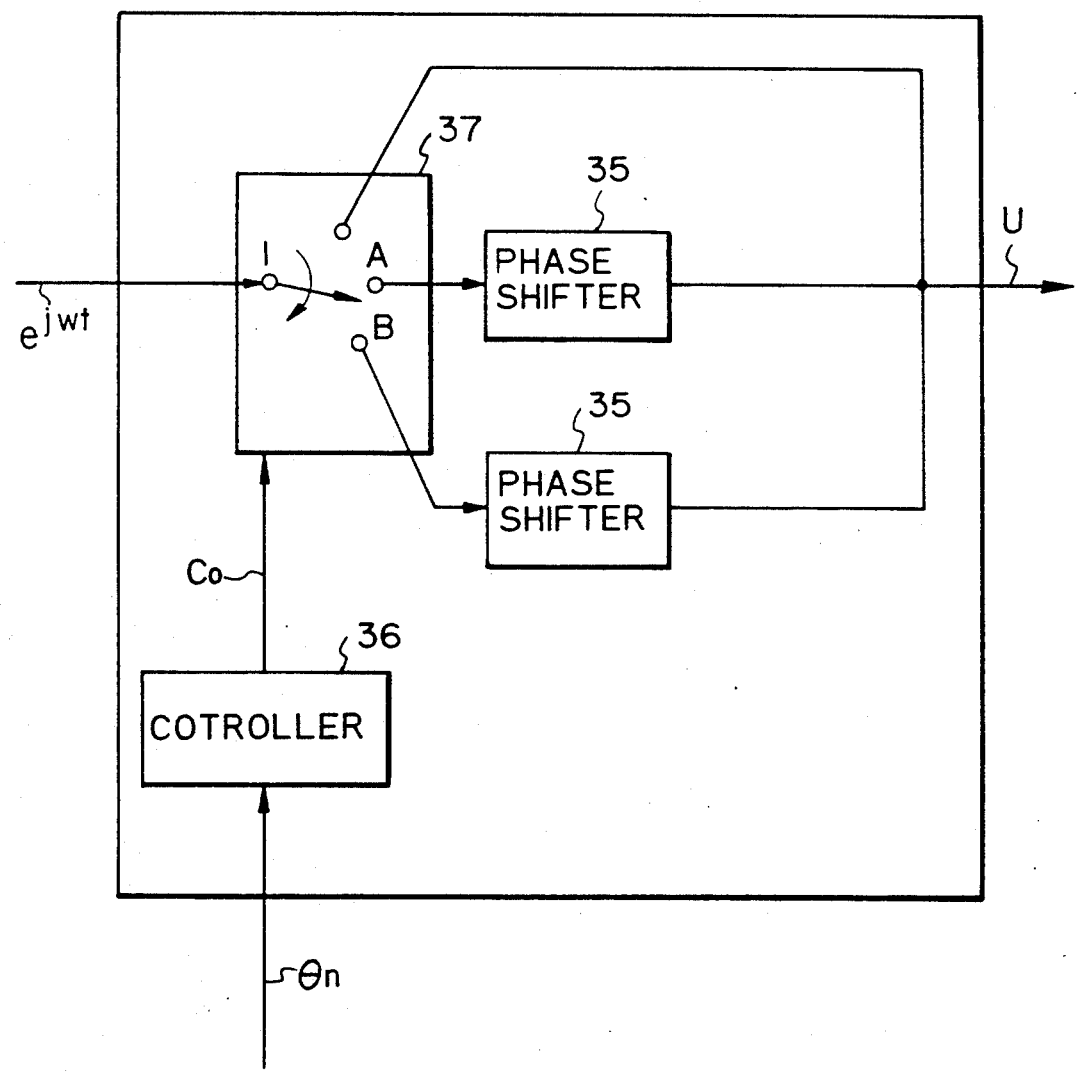

When the first modification is employed as the orthogonal sequence generator 29A, since the absolute values of the components of the sequence generated therefrom are the same as shown in FIG. 14B, the amplifiers 38 of the modulator 12A shown in FIG. 16 can be cancelled, and thus in this case the modulator 12A can be constituted as shown in FIG. 16B.

Representing as $U(t) = A_n \cos(\omega t + \phi_n)$, the amplitude $A_n$ and phase $\phi_n$ of U(t) are as follows in the case of expression 95:

$A_0 = 1$ and $\phi_0 = 0$ $A_1 = 1$ and $\phi_1 = 90\pi/180$ $A_2 = 1$ and $\phi_2 = 205.7\pi/180$ \quad (110)

Figure 16C:
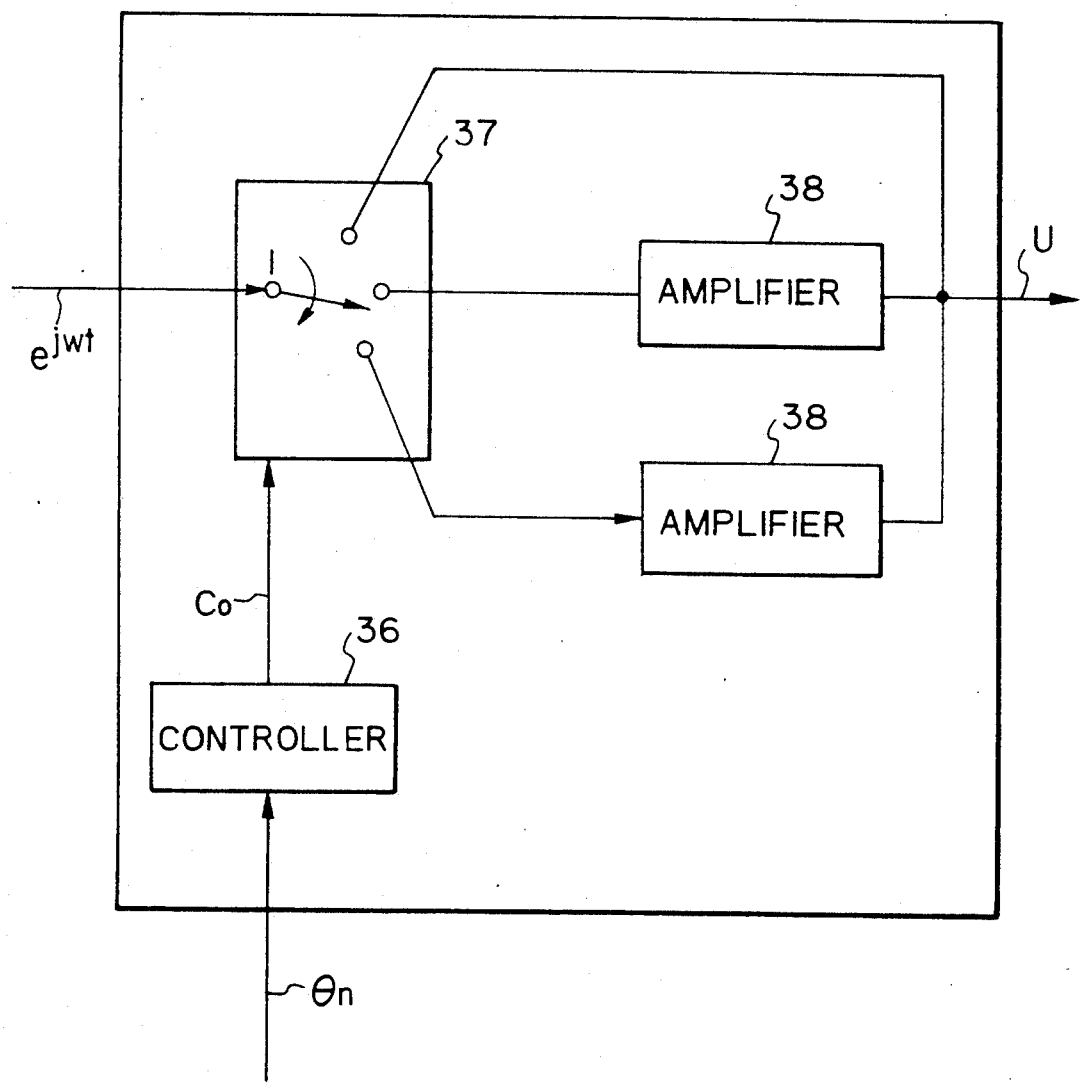

When the second modification is employed as the orthogonal generator 29A, since the phases of the components of the sequence generated therefrom are the same as shown in FIG. 14C, the phase shifters 35 of the modulator 12A shown in FIG. 16 can be cancelled, and thus in this case the modulator 12A can be constituted as shown in FIG. 16C. In the case of expression 103, the amplitude $A_n$ and phase $\phi_n$ of $U(t) = A_n \cos(\omega t + \phi_n)$ are as follows:

$A_0 = 1$ and $\phi_0 = 0$ $A_1 = 0.911$ and $\phi_1 = 0$ $A_2 = 0.488$ and $\phi_2 = 0$ \quad (111)

It is further understood by those skilled in the art that the foregoing description is a preferred embodiment of the disclosed device and that various changes and modifications may be made in the invention without departing from the spirit and scope thereof.

What is claimed is:

1. An apparatus for generating a multi-value orthogonal sequence comprising:
   generating means for outputting a multi-element M-sequence, components of which consist of elements $0, \epsilon, \epsilon^2, \ldots, \epsilon^{q-1}$ of a Galois field GF(q), and having a period $N=q^k-1$, where q is an integer equal to or more than 3, GF(q) has the q-number of elements, $\epsilon$ is a primitive element of the Galois field GF(q), and k is an integer equal to or greater than 2; and substituting means for substituting each component of said M-sequence output from said generating means with one of complex-numbers $z_0, z_1, \ldots, z_{q-1}$ in such a manner that when said component of said M-sequence is 0, it is substituted with $z_0 \neq 0$, and when said component is $\epsilon^i$ (i=1, 2, ..., q-1), it is substituted with $z_i$, where the set of $z_0, z_1, \ldots, z_{q-1}$ are the solution of the following simultaneous algebraic equations:

$$q^{k-2} \sum_{i=0}^{q-1} \sum_{j=0}^{q-1} z_i^* z_j - z_0^* z_0 = 0$$

$$q^{k-1} \sum_{i=0}^{q-1} z_i^* z_{mod_{q-1}(i+r)} + (q^{k-1} - 1) z_0^* z_0 = 0$$

where $mod_{q-1}(\cdot)$ represents a calculation of modulo (q−1) and is expressed as q−1 when the result is 0, * represents a complex conjugate, and r=1, 2, ..., q−2.

2. An apparatus according to claim 1, wherein said complex-numbers $z_0, z_1, \ldots, z_{q-1}$ have equal absolute values.

3. An apparatus according to claim 1, wherein the arguments of said complex-numbers $z_0, z_1, \ldots, z_{q-1}$ are the same so that $z_i/z_0$ (i=1, 2, ..., q−1) is a real number.

4. An apparatus according to claim 1, wherein said M-sequence generator means comprises:

shift register means including a plurality of delay elements connected in series for outputting signals input thereto after a predetermined time period from the reception of the input signals;

a plurality of multipliers for multiplying said respective signals output from said delay elements by feedback factors; and adder means for adding all of the multiplied signals provided by said multipliers to input the result to the delay element initially arranged in said shift register means, whereby said multi-element M-sequence is generated from the delay element finally arranged in said shift register means.

5. An apparatus according to claim 1, wherein said substituting means comprises a microcomputer.

6. A code-modulation apparatus of a transmission/reception system comprising:

an orthogonal sequence generator including generating means for generating a multi-element M-sequence, components of which consist of elements $0, \epsilon, \epsilon^2, \ldots, \epsilon^{q-1}$ of a Galois field GF(q) and has a period $N=q^k-1$, where q is an integer equal to or more than 3, GF(q) has the q-number of elements, $\epsilon$ is a primitive element of the Galois field GF(q), and k is an integer equal to or more than 2, and substituting means for substituting each component of said M-sequence output from said generating means with one of complex-numbers $z_0, z_1, \ldots, z_{q-1}$ in such a manner that when said component of said M-sequence is 0, it is substituted with $z_0 \neq 0$, and when said component is $\epsilon^i$ (i=1, 2, ..., q−1), it is substituted with $z_i$, where the set of $z_0, z_1, \ldots, z_{q-1}$ are the solution of the following simultaneous algebraic equations:

$$q^{k-2} \sum_{i=0}^{q-1} \sum_{j=0}^{q-1} z_i^* z_j - z_0^* z_0 = 0$$

$$q^{k-1} \sum_{i=0}^{q-1} z_i^* z_{mod_{q-1}(i+r)} + (q^{k-1} - 1) z_0^* z_0 = 0$$

where $mod_{q-1}(\cdot)$ represents a calculation of modulo (q−1) and is expressed as q−1 when the result is 0, * represents a complex conjugate, and r=1, 2, ..., q−2; and modulation means for code-modulating a local oscillation signal input thereto with said orthogonal sequence generated from said orthogonal sequence generator.

7. An apparatus according to claim 6, wherein absolute values of said complex-numbers $z_0, z_1, \ldots, z_{q-1}$ are the same.

8. An apparatus according to claim 7, wherein said modulation means comprises:

switching means for selectively transferring said input local oscillation signal to one of q-number of output-terminals corresponding to said complex-numbers $z_0, z_1, \ldots, z_{q-1}$;

control means coupled to the output of said orthogonal sequence generator for controlling a changeover of said switching means in response to said orthogonal sequence produced by said orthogonal sequence generator;

phase-shifting means connected to said output terminals of said switching means excluding at least one output-terminal corresponding to said complex-number $z_0$, for respectively shifting phases of said signals from said output terminals of said switching means, wherein the phase-shift values of said phase-shifting means are preset in accordance with the arguments of said complex-numbers $z_1, z_2, \ldots, z_{q-1}$; and an output stage coupled to said at least one output-terminal which is not connected to said phase-shifting means and to the output terminals of said phase-shifting means, for outputting the code-modulated signal.

9. An apparatus according to claim 6, wherein the arguments of said complex-numbers $z_0, z_1, \ldots, z_{q-1}$ are the same so that $z_i/z_0$ (i=1, 2, ..., q−1) is a real number.

10. An apparatus according to claim 9, wherein said modulation means comprises:

switching means for selectively transferring said input local oscillation signal to one of q-number of output-terminals corresponding to said complex-numbers $z_0, z_1, \ldots, z_{q-1}$;

control means coupled to the output of said orthogonal sequence generator for controlling a changeover of said switching means in response to said orthogonal sequence produced by said orthogonal sequence generator;

amplifier means connected to said output-terminals of said switching means excluding at least one output terminal corresponding to said complex-number $z_0$, for respectively amplifying amplitudes of said signals from said output terminals of said switching means, the amplification values of said amplifier means being preset in accordance with the absolute values of said complex-numbers $z_1, z_2, \ldots, z_{q-1}$ and an output stage coupled to said at least one output terminal which is not connected to said amplifier means and to the output terminals of said amplifier means, for outputting the code-modulated signal.

11. An apparatus according to claim 6, wherein said M-sequence generator means comprises.

shift register means including a plurality of delay elements connected in series for outputting signals input thereto after a predetermined time period from the reception of the input signals;

a plurality of multipliers for multiplying said respective signals output from said delay elements by feedback factors; and adder means for adding all of the multiplied signals provided by said multipliers to input the result to the delay element initially arranged in said shift register means, whereby said multi-element M-sequence is generated from the delay element finally arranged in said shift register means.

12. An apparatus according to claim 6, wherein said substituting means comprises a microcomputer.

13. An apparatus according to claim 6, wherein said modulation means comprises:

switching means for selectively transferring said input local oscillation signal to one of q-number of output-terminals corresponding to said complex-numbers $z_0, z_1, \ldots, z_{q-1}$;

control means coupled to the output of said orthogonal sequence generator for controlling a change-over of said switching means in response to said orthogonal sequence produced by said orthogonal sequence generator;

phase-shifting means connected to said output terminals of said switching means excluding at least one output-terminal corresponding to said complex-number $z_0$, for respectively shifting phases of said signals from said output terminals of said switching means, the phase-shift values of said phase-shifting means are preset in accordance with the arguments of said complex-numbers $z_1, z_2, \ldots, z_{q-1}$; and an output stage coupled to said at least one output-terminal which is not connected to said phase-shifting means and to the output terminals of said phase-shifting means, for outputting the code-modulated signal.

14. An apparatus according to claim 13, wherein at least one of said output-terminals of said phase-shifting means is connected to said output stage through amplifier means, and the amplification values of said amplifier means are preset in accordance with the absolute values of said complex-numbers $z_1, z_2, \ldots, z_{q-1}$.

15. An apparatus according to claim 6, wherein said transmission/reception system is a radar system.

* * * * *